United States Patent
Chen et al.

(10) Patent No.: US 10,438,303 B2
(45) Date of Patent: Oct. 8, 2019

(54) OPTIMIZATION AND DISTRIBUTION OF COUPONS IN RESIDENTIAL DEMAND RESPONSE

(71) Applicant: FUJITSU LIMITED, Kawasaki-shi, Kanagawa (JP)

(72) Inventors: Wei-Peng Chen, Fremont, CA (US); Mostafa Majidpour, Los Angeles, CA (US)

(73) Assignee: FUJITSU LIMITED, Kawasaki (JP)

( * ) Notice: Subject to any disclaimer, the term of this patent is extended or adjusted under 35 U.S.C. 154(b) by 641 days.

(21) Appl. No.: 14/842,653

(22) Filed: Sep. 1, 2015

(65) Prior Publication Data
US 2017/0061553 A1   Mar. 2, 2017

(51) Int. Cl.
*G06K 7/00*    (2006.01)
*G06Q 50/06*   (2012.01)
*G06Q 30/02*   (2012.01)
*G06Q 40/04*   (2012.01)

(52) U.S. Cl.
CPC ......... *G06Q 50/06* (2013.01); *G06Q 30/0204* (2013.01); *G06Q 30/0254* (2013.01); *G06Q 40/04* (2013.01)

(58) Field of Classification Search
USPC .......................... 235/375–385; 705/5, 35–45
See application file for complete search history.

(56) References Cited

U.S. PATENT DOCUMENTS

| 2009/0281885 A1* | 11/2009 | Castelli ................ G06Q 10/06 705/14.13 |
| 2014/0277769 A1* | 9/2014 | Matsuoka ............... F24F 11/30 700/278 |

OTHER PUBLICATIONS

"Analysis of Coupon Incentive-Based Demand Response with Bounded Consumer Rationality" by Hao Min, Le Xie, North American Power Symposium, Sep. 2014.
http://energycoupon.org/index.html accessed Sep. 1, 2015.
"Coupon Incentive-Based Demand Response: Theory and Case Study" Zhong et al., IEEE Transactions on Power Systems, vol. 28, Issue 2, Oct. 18, 2012.

* cited by examiner

*Primary Examiner* — Matthew Mikels
(74) *Attorney, Agent, or Firm* — Maschoff Brennan

(57) ABSTRACT

A method of coupon distribution is used in connection with a demand response (DR) event. The method includes clustering DR customers into customer clusters based on energy use behaviors of the DR customers. Suggested coupons are received from merchants, each coupon including load serving entity (LSE) and merchant contributions. Based on energy price forecast, the suggested coupons, and customer information, a coupon distribution is found to maximizes a financial benefit to the LSE and includes an optimal number of the suggested coupons to be distributed to the customer clusters. The suggested coupons are distributed to the customer clusters per the coupon distribution and collecting responses to the suggested coupons indicating participation. Based on the customer responses, the method includes estimating energy curtailment contributions of the DR customers and an actual energy price for the DR event and communicating to an independent system operator an energy transaction bid based thereon.

20 Claims, 12 Drawing Sheets

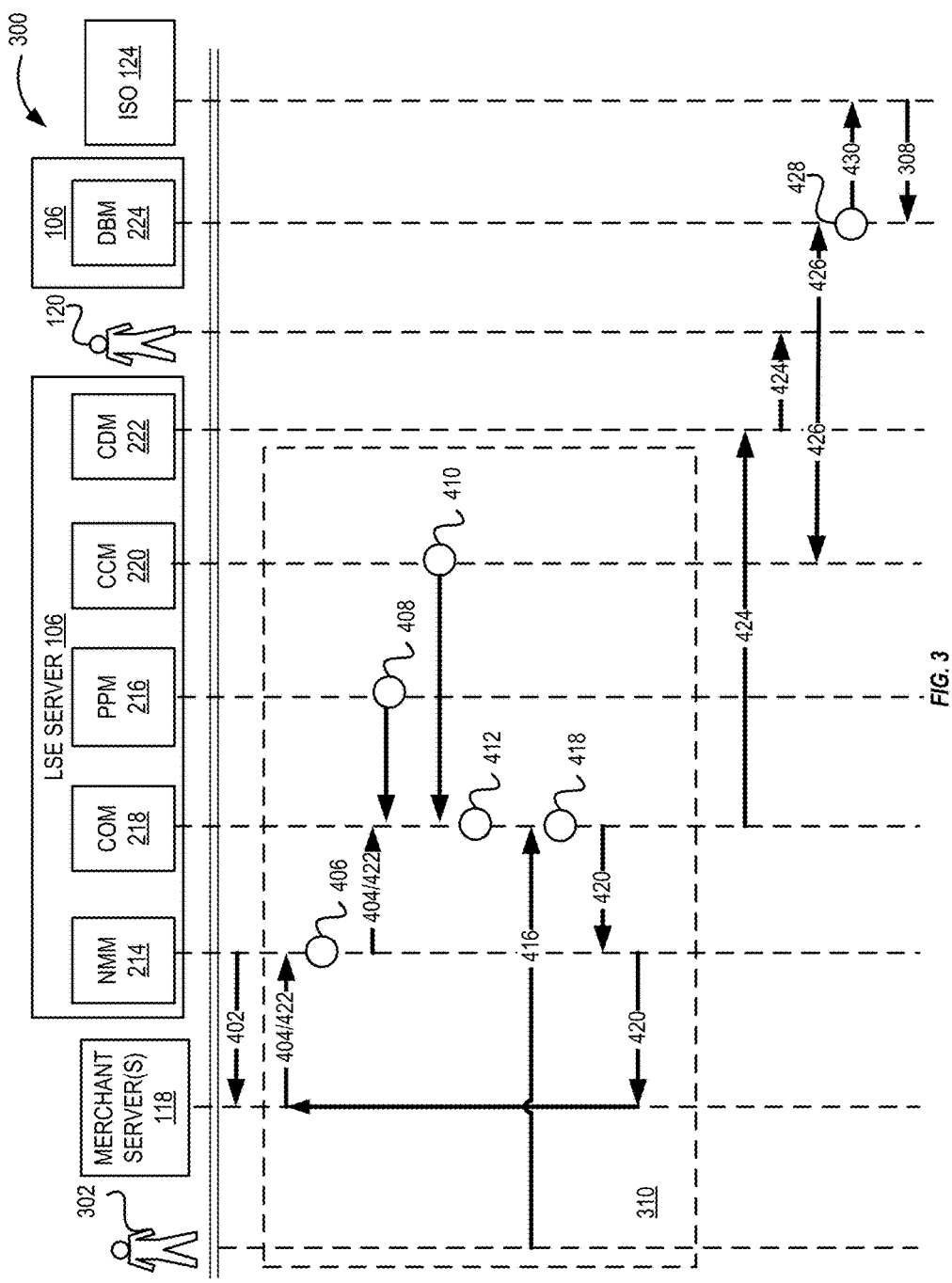

[1] "Adding coupons for hour 12 (with specified U0) will have more revenue per accepted coupon from coupons :(in order)"
[1] 46 44 47 91  1 73  8
[1] "Adding coupons for hour 13 (with specified U0) will have more revenue per accepted coupon from coupons :(in order)"
[1] 97 75 83  3 59
[1] "Adding coupons for hour 17 (with specified U0) will have more revenue per accepted coupon from coupons :(in order)"
[1] 20 36 85 18 95

.
.
.

[1] "Adding coupons for hour 6 (with specified U0) will have more revenue per accepted coupon from coupons :(in order)"
[1] 89 49 26 71
[1] "Adding coupons for hour 5 (with specified U0) will have more revenue per accepted coupon from coupons :(in order)"
 [1] 66 86 25 51 93 14 17  6 65 29 90 38
[1] "Adding coupons for hour 3 (with specified U0) will have more revenue (per accepted coupon) from coupons :(in order)"
[1] 30

*FIG. 6J*

[1,] "Coupon" "23"
[2,] "Coupon" "68"
[3,] "Coupon" "45"
[4,] "Coupon" "7"
[5,] "Coupon" "92"
[6,] "Coupon" "62"
[7,] "Coupon" "27"
[8,] "Coupon" "55"
[9,] "Coupon" "50"
[10,] "Coupon" "35"
[11,] "Coupon" "48"
[12,] "Coupon" "64"
[13,] "Coupon" "88"
[14,] "Hour" "15"
[15,] "Coupon" "80"
[16,] "Coupon" "19"
[17,] "Coupon" "22"
[18,] "Coupon" "63"
[19,] "Hour" "12"
[20,] "Coupon" "46"
[21,] "Coupon" "44"
[22,] "Coupon" "47"
[23,] "Coupon" "91"
[24,] "Coupon" "1"
[25,] "Coupon" "73"
[26,] "Coupon" "8"
[27,] "Hour" "13"
[28,] "Coupon" "97"
[29,] "Coupon" "75"
[30,] "Coupon" "83"
[31,] "Coupon" "3"
[32,] "Coupon" "59"
[33,] "Hour" "17"
[34,] "Coupon" "20"
[35,] "Coupon" "36"
[36,] "Coupon" "85"
[37,] "Coupon" "18"
[38,] "Coupon" "95"
[39,] "Hour" "14"
[40,] "Hour" "10"
[41,] "Coupon" "28"
[42,] "Coupon" "72"
[43,] "Coupon" "9"
[44,] "Coupon" "74"
[45,] "Coupon" "61"
[46,] "Coupon" "96"
[47,] "Coupon" "98"
[48,] "Hour" "15"
[49,] "Coupon" "54"
[50,] "Coupon" "39"
[51,] "Coupon" "70"
[52,] "Coupon" "87"
[53,] "Coupon" "24"
[54,] "Coupon" "31"
[55,] "Coupon" "11"
[56,] "Coupon" "4"
[57,] "Hour" "11"
[58,] "Coupon" "100"
[59,] "Hour" "20"
[60,] "Coupon" "78"
[61,] "Hour" "18"
[62,] "Hour" "16"
[63,] "Coupon" "13"
[64,] "Coupon" "57"
[65,] "Coupon" "16"
[66,] "Hour" "21"
[67,] "Coupon" "5"
[68,] "Coupon" "53"
[69,] "Hour" "8"
[70,] "Coupon" "60"
[71,] "Hour" "19"
[72,] "Coupon" "34"
[73,] "Coupon" "94"
[74,] "Coupon" "42"
[75,] "Coupon" "21"
[76,] "Coupon" "81"
[77,] "Hour" "9"
[78,] "Coupon" "41"
[79,] "Coupon" "10"
[80,] "Hour" "7"
[81,] "Coupon" "79"
[82,] "Coupon" "67"
[83,] "Hour" "22"
[84,] "Coupon" "82"
[85,] "Coupon" "56"
[86,] "Coupon" "52"
[87,] "Coupon" "2"
[88,] "Coupon" "99"
[89,] "Coupon" "43"
[90,] "Hour" "6"
[91,] "Coupon" "89"
[92,] "Coupon" "49"
[93,] "Coupon" "26"
[94,] "Coupon" "71"
[95,] "Hour" "5"
[96,] "Coupon" "66"
[97,] "Coupon" "86"
[98,] "Coupon" "25"
[99,] "Coupon" "51"
[100,] "Coupon" "93"
[101,] "Coupon" "14"
[102,] "Coupon" "17"
[103,] "Coupon" "6"
[104,] "Coupon" "65"
[105,] "Coupon" "29"
[106,] "Coupon" "90"
[107,] "Coupon" "38"
[108,] "Hour" "3"
[109,] "Coupon" "30"

*FIG. 6K*

OPTIMIZATION AND DISTRIBUTION OF COUPONS IN RESIDENTIAL DEMAND RESPONSE

FIELD

The embodiments discussed herein are related to optimization and distribution of coupons in residential demand response.

BACKGROUND

Load serving entities (LSEs) such as utilities incentivize curtailment of resource usage during certain high load periods to increase the ability of the LSEs to meet a larger demand or to minimize production costs. For example, in summer months, peak energy usage may occur on hot days in the late afternoon. A utility may offer an incentive to a customer to reduce energy usage in the customer's home during the late afternoon. In response, the customer may avoid doing the dishes, turn down the air-conditioning in the home, or otherwise reduce energy usage. Since a single residence may not consume enough energy to make a large difference in energy consumption, the utility may offer incentives to many customers and an aggregation of resource curtailment at the homes associated with the customers may be enough to reduce consumption for a demand response (DR) event. In this manner, the utility may increase its ability to meet energy demands during the peak energy usage and/or avoid producing or purchasing additional energy to meet the energy demands.

The curtailment in resource usage during peak or high load periods may be referred to generally as demand response (DR). The resource usage curtailment during a specified time period may be referred to as a DR event. DR events generally occur when a utility expects a high demand and asks customers to reduce or curtail resource usage.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of coupon distribution for a demand response (DR) event includes clustering one or more DR customers into two or more customer clusters based on energy use behaviors of the DR customers. The method may include receiving suggested coupons from two or more merchants. The suggested coupons each include a load serving entity (LSE) contribution and a merchant contribution for a DR event. Based on energy price forecast, the suggested coupons, and customer information, the method may include finding a coupon distribution that generates a financial benefit to the LSE. The coupon distribution includes a specified number of the suggested coupons to be distributed to one or more of the customer clusters. The method may include distributing one or more of the suggested coupons to one or more of the customer clusters according to the coupon distribution. The method may include collecting customer responses to the distributed suggested coupons that indicate participation of the DR customers. Based on the collected customer responses, the method may include estimating energy curtailment contributions of the DR customers and an actual energy price for at least a portion of the DR event. The method may include communicating to an independent system operator (ISO) an energy transaction bid based on the estimation of the energy curtailment and the actual energy price.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 illustrates an example sequence in which a method of coupon distribution may be performed;

FIGS. 6A-6K illustrate a simulated example of coupon distributions according to one or more coupon distribution processes, all arranged in accordance with at least one embodiment described herein.

DESCRIPTION OF EMBODIMENTS

Figure 1:
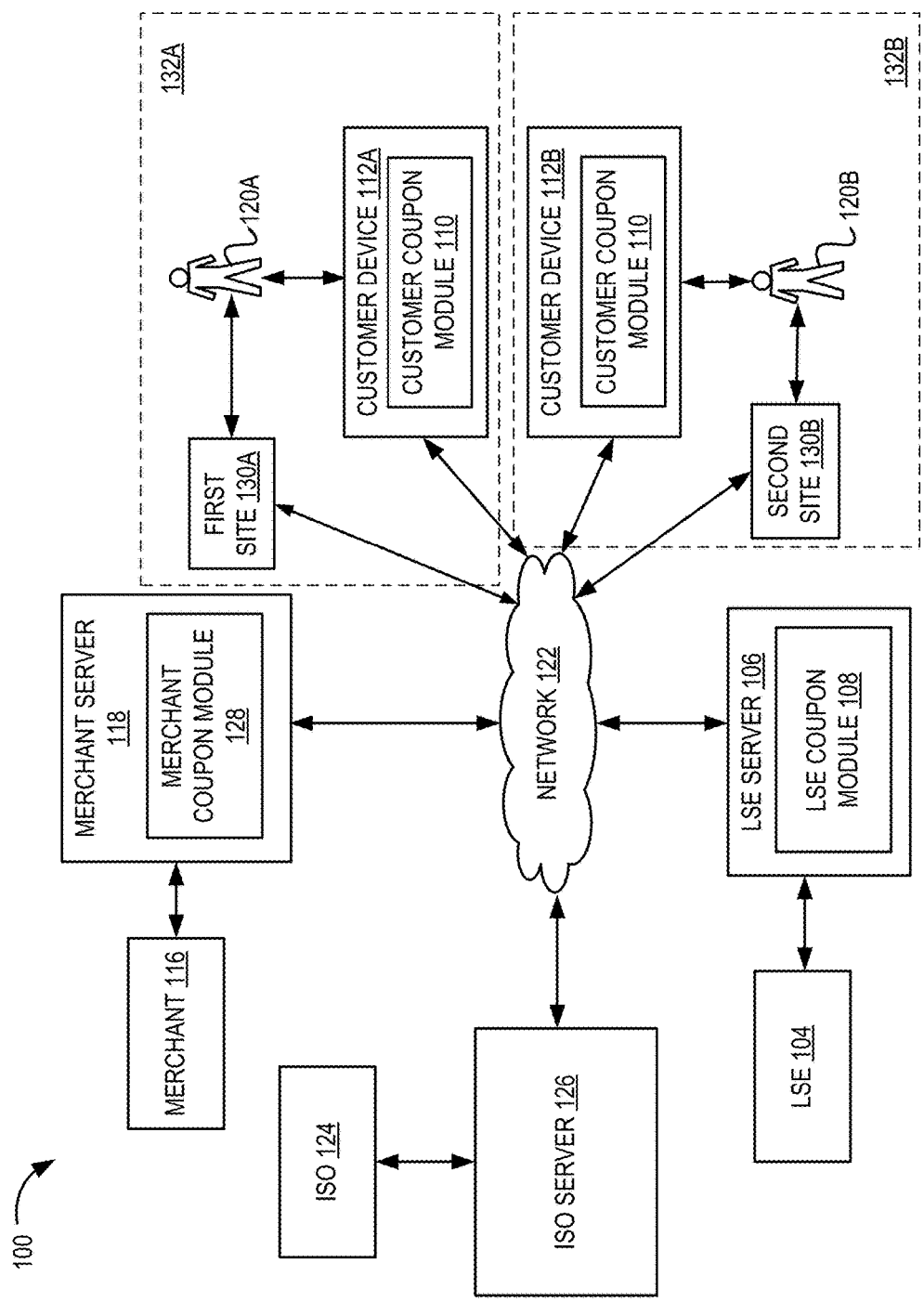
FIG. 1 is a block diagram of an example operating environment in which a coupon distribution for a residential DR event may be implemented.

Some residential demand response (DR) programs provide incentives to DR customers to curtail resource consumption in their residences. These DR programs may have low compliance because the DR customers may find the incentives to be insufficient and not worth the inconvenience of curtailing resource consumption. In addition, it may be difficult to predict which DR customers will comply with the DR program and when they will comply with the program. As a result, it may be difficult to predict how much resource consumption may be curtailed, which may discourage a load serving entity (LSE) such as a utility and/or a DR aggregator from initiating DR events.

Accordingly, some embodiments described in this disclosure relate to coupon distributions that may be targeted at residential DR customers. The coupons may include an incentive of both the LSE and a merchant that is offered to DR customers in exchange for participation in a DR event. The distribution of the coupons may generate a financial benefit to the LSE. In some embodiments, the distribution may be optimized to maximize a financial benefit to the LSE.

In an example embodiment, DR customers are clustered into multiple customer clusters based on their energy usage behaviors. Based on a predicted energy price, customer information, and suggested coupons provided by multiple merchants, an optimized coupon distribution is determined. The coupon distribution includes a certain number of each of the suggested coupons that are to be distributed to each of the customer clusters. Responses to distributed coupons may be received, which may lead to further distributions and/or determination of a subsequent coupon distribution. In addition, from the response, a curtailment may be estimated and the LSE may generate a bid for energy during a particular time based on the estimated curtailment. The bid may reflect the energy curtailment and/or an adjusted energy price in a market based on the energy curtailment.

In some embodiments, coupon design may be iterative. For instance, the LSE may present one or more versions of the coupons to the merchants. The merchants may adopt a version of the coupon or a feature thereof. A coupon distribution may be determined from suggested coupons of the merchants. During determination of the coupon distribution determination, one or more additional coupon opportunities may be identified. The LSE may propose new coupons based on the coupon opportunities. The merchants may provide new coupons based on the proposed new coupons or not. This process may continue until the LSE and the merchants are satisfied with suggested coupons that are ultimately distributed to DR customers according to a coupon distribution.

Some embodiments will be explained with reference to the accompanying drawings. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

FIG. 1 is a block diagram of an example operating environment 100 in which a coupon distribution for a residential DR event may be implemented. The coupon distribution of the operating environment 100 may be found such that a financial benefit is generated for the LSE 104. Additionally, the coupon distribution may be optimized to maximize the financial benefit of the DR event for an LSE 104. Participation of DR customers 120A and 120B (generally, DR customer 120 or DR customers 120) in a DR event may include the DR customers 120 altering or agreeing to enable the alteration of an operating state of sites 130 or equipment located thereon. To promote participation, coupons may be communicated from the LSE 104 to customer devices 112A and 112B (generally, customer device 112 or customer devices 112) associated with the DR customers 120. The DR customers 120 may then opt into or out of participation in the DR event. In the operating environment 100, the LSE 104 may optimize which of the DR customers 120 receive coupons and/or offers and incentives included in the coupons received by the DR customers 120. In particular, the LSE 104 may optimize a coupon distribution to maximize the financial benefit to the LSE 104.

The operating environment 100 of FIG. 1 may include an ISO server 126, an LSE server 106, the sites 130, a merchant server 118, and the customer devices 112 (collectively, environment components). The customer devices 112 and the sites 130 may be associated with the DR customers 120. Additionally, in the operating environment 100, the merchant server 118 may be associated with the merchant 116, the ISO 124 may be associated with the ISO server 126, and the LSE 104 may be associated with the LSE server 106. As used with reference to describing relationships in the operating environment 100, the term associated indicates a relationship of control and/or ownership. For example, a first DR customer 120A may be associated with a first site 130A and a first customer device 112A. Accordingly, the first DR customer 120A may own or regularly operate the first customer device 112A. In addition, communications sent from the first customer device 112A may be attributed to the first DR customer 120A and communications sent to the first customer device 112A may be intended for the first DR customer 120A. Similar relations may exist between other entities (e.g., 116, 124, 104, and 120B) and other environment components (e.g., 118, 126, 106, 130B, and 112B).

In the operating environment 100, the environment components may communicate via a network 122. For example, information and data pertaining to coupon distribution and optimizations thereof may be communicated via the network 122. Each of the environment components and the network 122 are described in the following paragraphs.

The network 122 may include wired or wireless networks, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 122 may enable communication via a standard-based protocol such as smart energy profile (SEP), Echonet Lite, OpenADR, or another suitable protocol (e.g., Wi-Fi, ZigBee, HomePlug Green, etc.).

In the operating environment 100, DR events may include curtailment of energy in one or more of the sites 130. For example, the DR customers 120 may reduce an operating condition or cease operation of one or more pieces of equipment at the sites 130. For example, during a DR event, the first DR customer 120A may turn off her clothes dryer. Additionally or alternatively, one or more pieces of equipment at the sites 130 may be configured to receive commands from the LSE server 106 during a DR event. The commands may change the operational state of the pieces of equipment. For example, in response to the first DR customer 120A agreeing to participate in the DR event, the LSE server 106 or another system may communicate a command to a piece of equipment (e.g., a thermostat or a water heater) that alters an operating condition of the piece of equipment.

The sites 130 may include buildings, structures, equipment, or other objects that use energy that may be curtailed during a DR event controlled or managed by the LSE 104. The sites 130 may include multiple types of structures ranging from private residences to large industrial factories or office buildings. In some embodiments, the sites 130 included in the operating environment 100 may be residences and/or small- and medium-size business (SMB) sites.

In the operating environment 100, management of energy supplied to the sites 130 or at least some portion thereof is performed by the LSE 104. For example, the LSE server 106 may coordinate with the DR customers 120 to curtail energy use during DR events. In response to compliance with the DR event, the LSE 104 may provide a financial benefit or another benefit to the DR customers 120. In the operating environment 100, the particular benefit may be communicated to the customer devices 112 in the form of a coupon. The coupon may include an offer of services or goods in exchange for participation in the DR event. In some embodiments design of the coupons may be performed as discussed in U.S. patent application Ser. No. 14/610,929, filed Jan. 30, 2015, which is incorporated herein by reference in its entirety.

In response to the coupons, the DR customer 120 may decide whether to participate in the DR event based at least partially on the coupons. The DR customer 120 may communicate her willingness or unwillingness to participate in the DR event. In some embodiments, the customer devices 112 may include a customer coupon module 110. The customer coupon module 110 may be configured to interface and communicate with the LSE server 106 or a LSE coupon module 108 thereon. The coupons may be received by the customer coupon module 110 and/or displayed to the DR customer 120 on a display device included in or communicatively coupled to the customer device 112A. Additionally, the customer device 112 and/or the customer coupon module 110 may be configured to receive input of the DR customer 120 effective to indicate their willingness or unwillingness to participate in the DR event. For example, a first customer device 112A may include a mobile device that includes a touch screen. The coupons may be displayed on the touch screen. If the first DR customer 120A finds the incentive in the coupons sufficient to participate in the DR event, the first DR customer 120A may select, for instance, an icon presented by the customer coupon module 110. In response, the customer coupon module 110 may communicate an acceptance to the LSE server 106.

The customer coupon module 110 as well as the other modules (e.g., 128 and 108 of FIGS. 1 and 214, 216, 218, 220, 222, and 224 of FIG. 2) may be implemented using hardware including a processor, a microprocessor (e.g., to perform or control performance of one or more operations), a field-programmable gate array (FPGA), or an application-specific integrated circuit (ASIC). In some other instances, the customer coupon module 110 as well as the other modules may be implemented using a combination of hardware and software. Implementation in software may include rapid activation and deactivation of one or more transistors or transistor elements such as may be included in hardware of a computing system (e.g., the LSE server 106, the merchant server 118, the customer devices 112, and the ISO server 126). Additionally, software defined instructions may operate on information within transistor elements. Implementation of software instructions may at least temporarily reconfigure electronic pathways and transform computing hardware.

The customer devices 112 may include a computer device that includes a processor, memory, and communicating capabilities. For example, the customer devices 112 may include a laptop computer, a desktop computer, a tablet computer, a mobile telephone, a personal digital assistant ("PDA"), a smartphone, a mobile email device, a portable game player, a portable music player, a television with one or more processors embedded therein or coupled thereto, or other electronic devices capable of accessing the network 122.

In the operating environment 100, the DR customers 120 may include residential energy customers. Examples of residential energy customers include home owners, renters, and landlords. Residential energy customers may be more likely to respond to coupons that include incentives such as goods and services offered by the merchants 116. In addition, participation of residential customers in DR events poses a challenge because an amount of energy curtailed by each of the DR customers 120 is relatively small when compared to large industrial energy customers. Accordingly, the LSE 104 may utilize one or more embodiments described in this disclosure to gain participation by large groups of the DR customers 120.

Embodiments described in this disclosure however, are not limited to residential energy customers. Coupon distributions may be optimized for participation with small-to-medium business (SMB) customers or other types of DR customers 120.

The ISO server 126 may include a hardware server that includes a processor, memory, and network communication capabilities. The ISO server 126 may be configured to communicate with the other environment components via the network 122. For example, the ISO server 126 may receive an energy transaction bid from the LSE server 106. The energy transaction bid may include a price for a particular amount of energy that is managed or otherwise controlled by the ISO 124 that is associated with the ISO server 126. In response to the energy transaction bid, the ISO server 126 may communicate a market clearance result to the LSE server 106 that accepts the energy transaction bid.

The energy transaction bid may be based on the coupon distribution and estimations of energy curtailment by the DR customers 120 in response to coupons. For instance, if the LSE 104 determines that the distribution of the coupons to the DR customers 120 results in a market opportunity (e.g., sale of curtailed energy for a profit) for the LSE 104, then the energy transaction bid may capitalize the market opportunity.

In the depicted embodiment, the operating environment 100 includes the ISO 124. In some embodiments, the operating environment 100 may include a regional transmission organization (RTO) or another entity that controls and monitors an electricity transmission grid or portion thereof.

The merchant server 118 may include a hardware server that includes a processor, memory, and network communication capabilities. The merchant server 118 may be configured to communicate with the other environment components via the network 122. The merchant server 118 may be associated with the merchant 116. The merchant 116 may offer products and/or services for inclusion with coupons. The merchant 116 may develop or generate suggested coupons, which may be communicated to the LSE server 106 for evaluation by the LSE 104. In response, the LSE 104 may accept the suggested coupons, filter one or more of the suggested coupons, distribute the suggested coupons, or some combination thereof.

In some embodiments, the LSE 104 may evaluate the financial benefit provided by the suggested coupon. For example, the LSE server 106 may find a coupon distribution that optimizes a financial benefit to the LSE 104. In some circumstances, the LSE 104 may respond to the merchant 116 with LSE proposed coupons, which may be modifications or alternative suggested coupons. The merchant 116 may respond with new suggested coupons or may accept the modifications or alternative suggested coupons. Any new suggested coupons may be evaluated by the LSE 104. The above process, which is referred to as negotiations, may continue until the LSE 104 and the merchant 116 have agreed to the suggested coupons and the offers and incentives that are to be included in the suggested coupons.

The communication between the LSE 104 and the merchant 116 may be via the merchant server 118 and the LSE server 106 and/or via a merchant coupon module 128 and a LSE coupon module 108. For example, in embodiments including the merchant coupon module 128 and the LSE coupon module 108, the negotiations and evaluations of suggested coupons may be via the merchant coupon module 128 and the LSE coupon module 108. Some additional details of the negotiations are provided elsewhere in this disclosure.

The LSE server 106 may include a hardware server that includes a processor, memory, and network communication capabilities. The LSE server 106 may be configured to communicate with the other environment components via the network 122. In the operating environment 100, the LSE 104 may be associated with the LSE server 106. The LSE 104 may include or be affiliated with a utility that generates energy that is supplied to the sites 130.

Additionally or alternatively, the LSE 104 may include a DR aggregator. The DR aggregator may be an intermediate entity that manages the DR customers 120 for participation in DR events at the request of a utility. For example, during periods of high energy demand, a utility may offer an incentive to the DR aggregator to curtail a particular amount of energy. The DR aggregator may organize the DR customers 120 for participation in the DR event. When organized, the DR customers 120 in the aggregate may curtail the particular amount of energy. The DR aggregator may pass along a portion of the incentive to the DR customers 120 for their participation in the DR event. In the operating environment 100, coupons are used by the LSE 104 to promote participation in the DR event.

The LSE 104 may be privy to or may access customer information about energy usage of the DR customers 120. For instance, the LSE 104 may gather energy usage data from smart meters that are installed at the sites 130. Additionally, the LSE 104 may have or access records indicating past participation in the DR events during particular ambient conditions (e.g., time of year, time of day, weather patterns, and the like). Based on the customer information, the LSE coupon module 108 may cluster the DR customers 120 into two or more customer clusters 132A and 132B (generally, customer cluster 132 or customer clusters 132). The customer clusters 132 may be based on energy use behaviors of the DR customers 120. For example, energy use behaviors of the DR customers 120 may include: overall energy use within a particular range of one another (e.g., within 5%), participation in a particular number of prior DR events, compliance with a certain number of prior DR events, curtailment or curtailment availability within a particular range (e.g., about 5% of energy use), and the like.

The LSE coupon module 108 may cluster one or more of the DR customers 120 prior to each DR event, during DR events, for a season, upon receipt of new customer information, or according to another schedule.

With the DR customers 120 in the customer clusters 132, the LSE coupon module 108 may receive suggested coupons from the merchant server 118. The LSE coupon module 108 may filter some portion of the suggested coupons. The LSE coupon module 108 may be configured to find a coupon distribution to the customer clusters 132 of suggested coupons or some portion thereof. The coupon distribution may be configured to generate a financial benefit to the LSE 104. The coupon distribution may be based on an energy price forecast, the suggested coupons, and customer information. The coupon distribution may include a specified number of the suggested coupons to be distributed to one or more of the customer clusters 132.

The coupon distribution may be based on a particular set of suggested coupons communicated by the merchant 116.

The LSE coupon module 108 may identify opportunities that may be exploited though issuance of coupons that are not included in the particular set of suggested coupons. The LSE coupon module 108 may then communicate to the merchant server 118 LSE proposed coupons that address the opportunities. In response, the merchant 116 may communicate new suggested coupons to the LSE server 106. The LSE coupon module 108 may find a subsequent coupon distribution based on the new suggested coupons. This process may continue until the LSE coupon module 108 is satisfied with the coupon distribution.

The LSE coupon module 108 may then distribute one or more of the suggested coupons to one or more of the customer clusters 132 according to the coupon distribution. For example, the LSE coupon module 108 may communicate a first suggested coupon to the first customer device 112A of the first DR customer 120 and to any other DR customers of a first customer cluster 132A.

The LSE coupon module 108 may then collect customer responses to the distributed suggested coupons that indicate participation of the DR customers 120. Based on the collected customer responses, LSE coupon module 108 may estimate energy curtailment contributions of the DR customers 120 and an actual energy price for at least a portion of the DR event. The LSE coupon module 108 may communicate to the ISO server 126 an energy transaction bid based on the estimation of the energy curtailment and the actual energy price.

Modifications, additions, or omissions may be made to the operating environment 100 without departing from the scope of the present disclosure. Specifically, the operating environment 100 may include two or more DR customers 120, two or more sites 130, two or more customer devices 112, one or more LSE servers 106, one or more LSEs 104, one or more ISOs 124, one or more ISO servers 126, one or more merchants 116, one or more merchant servers 118 or any combination thereof. The present disclosure may also apply to operating environments 100 in which energy or any other resource may be curtailed.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
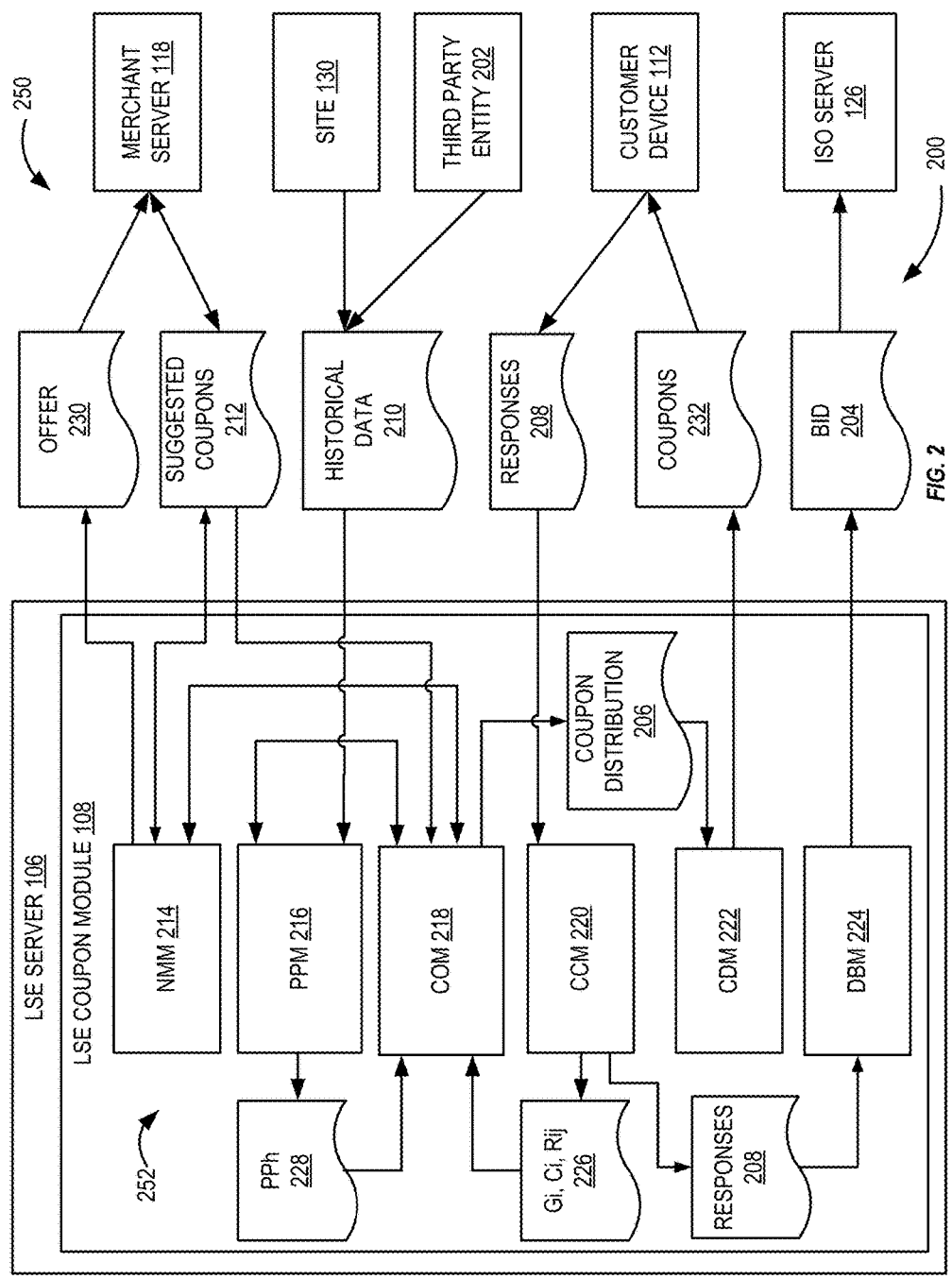
FIG. 2 illustrates an example coupon distribution process that may be implemented in an operating environment such as the operating environment of FIG. 1.

FIG. 2 illustrates an example coupon distribution process 200 that may be implemented in an operating environment 250. The operating environment 250 is substantially similar to the operating environment 100 of FIG. 1. For example, the operating environment 250 includes the LSE server 106, the merchant server 118, the site 130, the customer device 112, and the ISO server 126, which are described with reference to FIG. 1. In addition, a third party entity 202 is included in the operating environment 250, which is described below. The operating environment 250 omits a network with the understanding that communications of data and information (e.g., 212, 210, 208, 206, and 204) between the LSE server 106, the merchant server 118, the site 130, the customer device 112, and the third party entity 202 may be via a network such as the network 122 of FIG. 1.

In addition, FIG. 2 depicts an example of the LSE coupon module 108 of the LSE server 106. The LSE coupon module 108 may include a price prediction module (PPM) 216, a customer cluster module (CCM) 220, a coupon optimality module (COM) 218, a negotiation with merchant module (NMM) 214, a coupon distribution module (CDM) 222, and a DR bidding module (DBM) 224. The PPM 216, the CCM 220, the COM 218, the NMM 214, the CDM 222, and the DBM 224 are collectively referred to as LSE modules 252.

One or more of the LSE modules 252 may be implemented using hardware including a processor, a microprocessor (e.g., to perform or control performance of one or more operations), an FPGA, or an ASIC. In some other instances, one or more of the LSE modules 252 may be implemented using a combination of hardware and software. Implementation in software may include rapid activation and deactivation of one or more transistors or transistor elements such as may be included in hardware of a computing system (e.g., the LSE server 106, the merchant server 118, the customer devices 112, and the ISO server 126). Additionally, software defined instructions may operate on information within transistor elements. Implementation of software instructions may at least temporarily reconfigure electronic pathways and transform computing hardware.

In the coupon distribution process 200 of FIG. 2, the NMM 214 may communicate an initial offer 230 to the merchant server 118. The initial offer may include initial coupon designs. The initial coupon designs may include a merchant contribution, an LSE contribution, the related DR event, and a number of coupons. A merchant that is associated with the merchant server 118 may generate suggested coupons 212 and communicate the suggested coupons 212 to the NMM 214. In some circumstances, the suggested coupons 212 may adopt one or more features of the initial coupon designs. In other circumstances, the merchant may disregard the initial coupon designs and the suggested coupons 212 may be based on other factors.

The suggested coupons 212 may be received by the NMM 214. In FIG. 2, only one merchant server 118 is depicted. In some embodiments multiple merchant servers 118 may be in communication with the LSE server 106. One or more of the multiple merchant servers 118 may each communicate suggested coupons 212 to the NMM 214. For example, the suggested coupons may be received from two or more merchants. The suggested coupons 212 may include an LSE contribution and/or a merchant contribution for a DR event. The LSE contribution may include an amount that the LSE (e.g., LSE 104) is paying to the DR customer (e.g., DR customer 120) in exchange for participation in the DR event. In general, the LSE contribution may include a monetary amount that may be credited to a utility bill of the DR customer. The merchant contribution may include any type of financial incentive that is exchanged for participation in the DR event. Some examples of the merchant contribution may include a coupon for a good and/or a discount (e.g., $1 off a service provided by the merchant).

The suggested coupons 212 may be formatted according to a particular format. For example, in some embodiments, the suggested coupons 212 may be formatted according to coupon format expression:

Coupon[[j]]=c(M_id, Mj, U_id, Uj, DR start time, DR end time, coupon#)

In the coupon format expression, j represents a coupon index parameter. The parameter Coupon[[j]] represents one of the suggested coupons identified by the coupon index parameter j. The parameter M_id represents an identifier of one of the merchants. The parameter Mj represents a merchant contribution of the coupon identified by the coupon index parameter j of the merchant. The parameter U_id represents an identifier of an LSE. The parameter Uj represents an LSE contribution of the coupon identified by the coupon index parameter j of the LSE. The parameter DR start time represents a start time of the DR event for which the coupon is identified by the coupon index parameter j is suggested. The parameter DR end time represents an end time of the DR event. The parameter coupon# represents a number of coupons offered.

For example, one of the suggested coupons 212 may include Coupon[[8]]=c('REI®',1,'PacifiCorp®',0.5;'2 pm', '4 pm',100000). Accordingly, the suggested coupon indicates that for the DR event between 2:00 pm and 4:00 pm, a DR customer may receive an incentive from REI® for $1.00 and an incentive from PacifiCorp® for $0.5 and that PacifiCorp is offering 100,000 of these coupons.

A total value of the merchant contribution and LSE contribution is a total discount that the specific coupon offers to the DR customers. Also, each coupon might come with restrictions that the merchant imposes on the redemption of the value. For example, the time or product application may be expressly limited.

In some embodiments, the coupon may be combined with a critical peak pricing (CPP) program. In the CPP program rates may be increased during periods of anticipated high loads or critical events. Increased rates during these periods may encourage curtailment of energy usage. The coupons may include an acceptance of increased rates associated with the CPP program. Accordingly, in these and other embodiments, if a DR customer responds to participate in a DR event, then she may receive the incentives and with the response agree to the increased rates during the DR event.

The NMM 214 may receive the suggested coupons 212 from the merchant server 118. The NMM 214 may then communicate the suggested coupons 212 or some portion thereof to the COM 218. In some embodiments, the NMM 214 may verify that the LSE contribution is less than a particular LSE contribution limit and/or the merchant contribution is more than a particular merchant contribution limit.

In some embodiments, the verification of the suggested coupons 212 may be performed according to LSE contribution and merchant contribution expressions:

$$U\_j \leq U\_o;$$

and $$M\_j \geq M\_o.$$

In the LSE contribution and merchant contribution expressions, j represents the coupon index parameter as described above. The parameter U_j represents the LSE contribution for one of the suggested coupons identified by the coupon index parameter j. The parameter M_j represents the merchant contribution for the suggested coupons identified by the coupon index parameter j. The parameter U_o represents a maximum LSE contribution. The parameter M_o represents a minimum contribution for a specific merchant. In response to one or both of the LSE contribution and merchant contribution expressions being false, one or more of the suggested coupons 212 may be filtered and/or rejected.

In some embodiments, the maximum LSE contribution and/or the minimum contribution for the specific merchant may be based on historical data 210 and/or price prediction information (e.g., PPh 228). The maximum LSE contribution may be set such that the LSE benefits financially even if every DR customer in every customer cluster participates in the DR event.

The PPM 216 may predict day ahead prices and real time prices (collectively, energy price forecast) for a DR operation day. The energy price forecast is represented in FIG. 2 by price prediction information per hour (PPh) 228. The energy price forecast may be based on the historical data 210. The historical data 210 may include historical price data (e.g., historical energy prices for a particular hour), other historical data such as weather data or other ambient condition data that may affect energy usage, historical energy usage data particular to the site 130, and the like. The historical data 210 may be received from the site 130 (e.g., using a smart meter) or may be accessed from the third party entity 202 such as a weather station. In some embodiments, the PPh 228 may be a single point with a probability of 1. In some embodiments, the PPh 228 may include a probabilistic distribution function. The PPM 216 may communicate the PPh 228 to the COM 218.

The CCM 220 may cluster the DR customers into customer clusters. The customer clusters may be based on customer information that may be accessed from the site 130, the customer device 112, the third party entity 202, or some combination thereof. In general, the DR customers may be clustered based on energy use behaviors of the DR customers. The energy use behaviors may include curtailment behaviors or DR performance in previous DR events, for instance.

In the depicted embodiment, the CCM 220 may communicate customer cluster information and/or customer information to the COM 218. For example, the CCM 220 may communicate a number of DR customers in each customer cluster, which is represented by Gi. In addition, the CCM 220 may communicate a vector of expected curtailment per DR customer in each customer cluster in the next 24 hours, which is represented by Ci. The CCM 220 may further communicate an acceptance rate of one or more of the suggested coupons 212 for each of the customer clusters, which is represented by Rij.

The COM 218 may find a coupon distribution. The coupon distribution may be found based on the PPh 228, the suggested coupons 212, customer information (Gi, Ci, Rij) 226, or some combination thereof. The coupon distribution may be configured to generate a financial benefit of the LSE and/or optimized to maximize the financial benefit to the LSE (e.g., LSE 104). The coupon distribution may include a specified number of the suggested coupons 212 that are to be distributed to one or more of the customer clusters.

In some embodiments, the finding the coupon distribution is performed according to coupon distribution expressions:

$$\max_{DC_{ij}} \Sigma_i \Sigma_j [(PP \cdot {}^*C[,i] - UC[,j])^{T*} CON[,j] \cdot DC_{ij} \cdot r_{ij}];$$

subject to:

$$\Sigma_i DC_{ij} \leq N_j \forall j;$$

and $$\Sigma_j CON[,j]^T_{24 \times 1} \cdot DC_{ij} \cdot r_{ij} \leq [G_i G_i \ldots G_i]^T_{24 \times 1} \forall i.$$

In the coupon distribution expressions, the operator max represents a maximization function. The customer cluster index parameter i represents a customer cluster index parameter. The coupon index parameter j represents the coupon index parameter as described above. The parameter DC represents the coupon distribution. The parameter PP. represents an energy price forecast for an hour of a day. The parameter C[ ] represents a vector of expected curtailment per customer in a customer cluster in the next 24 hours. The parameter UC[ ] represents a vector of LSE contribution at each hour for one of the suggested coupons identified by the coupon index parameter j. The parameter CON[ ] represents a coupon on (CON) vector of binary {0, 1} showing a time of the day of the DR event associated with the suggested coupons identified by the coupon index parameter j. The parameter $r_{ij}$ represents an acceptance rate of the suggested coupons identified by the coupon index parameter j in one of the customer clusters identified by the customer cluster index parameter i. The parameter Nj represents a number of available coupons of the suggested coupons identified by the coupon index parameter j. The parameter Gi represents a number of customers in the customer cluster identified by the customer cluster index parameter i. The operator ∀ represents a "for any" operator.

Finding the coupon distribution may include making the CON vector and the UC vector for one or more of the suggested coupons 212. In some embodiments, each CON vector element of the CON vector is representative of an hour of the day of the DR event. The CON vector element is equal to zero unless the DR event is scheduled during a corresponding hour of the day and the CON vector element is equal to one if the DR event is scheduled during the corresponding hour of the day. For example, a CON vector for a DR event scheduled from 1:00 PM until 3:00 PM may be [0 0 0 0 0 0 0 0 0 0 0 0 1 1 1 0 0 0 0 0 0 0 0 0]. The first twelve CON vector elements and the last nine CON vector elements correspond to times 12:00 AM until 11:59 AM and 3:00 PM until 11:59 PM in which no DR event is scheduled. The thirteenth through the fifteenth CON vector elements correspond to 12:00 PM until 2:59 PM during which time the DR event is scheduled.

In some embodiments, each UC vector element of the UC vector is representative of an hour of the day of the DR event. The UC vector element is equal to zero unless the DR event is scheduled during a corresponding hour of the day and the UC vector element is equal to an LSE contribution for the suggested coupon per hour if the DR event is scheduled during a corresponding hour of the day. For example, a UC vector for a DR event scheduled from 1:00 PM until 3:00 PM in which the LSE contribution is $0.75 may be [0 0 0 0 0 0 0 0 0 0 0 0 ¾ ¾ ¾ 0 0 0 0 0 0 0 0 0]. The first twelve UC vector elements and the last nine UC vector elements correspond to times 12:00 AM until 11:59 AM and 3:00 PM until 11:59 PM in which no DR event is scheduled. The thirteenth through the fifteenth UC vector elements correspond to 12:00 PM until 2:59 PM during time which the DR event is scheduled. The LSE contribution for each of the thirteenth through the sixteenth UC vector elements may include $0.75.

The coupon distribution expressions may be expressed in linear programming as follows:

$$\max_{I_{ijc}} {}^T {}^* DC;$$

subject to: $A^*DC \leq b$, in which:

$$c = \begin{bmatrix} (PP.*C[,1] - UC[,1])^T * CON[,1] \cdot r_{11} \\ (PP.*C[,2] - UC[,1])^T * CON[,1] \cdot r_{12} \\ \vdots \\ (PP.*C[,n_g-1] - UC[,n_c])^T * CON[,n_c] \cdot r_{n_c(n_g-1)} \\ (PP.*C[,n_g] - UC[,n_c])^T * CON[,n_c] \cdot r_{n_c n_g} \end{bmatrix}_{n_c \cdot n_g \times 1} ;$$

where $n_g$ is a number of customer clusters;

where $n_c$ is a number of customer coupons;

$$DC = \begin{bmatrix} DC_{11} \\ DC_{21} \\ \vdots \\ DC_{(n_g-1)n_c} \\ DC_{n_g n_c} \end{bmatrix}_{n_c \cdot n_g \times 1};$$

$$A = \begin{bmatrix} A_1 \\ A_2 \end{bmatrix};$$

$$A_1 = \begin{bmatrix} CON[,1] \cdot r_{11} 0_{24 \times (n_g-1)} & \cdots & CON[,n_c] \cdot r_{1n_c} 0_{24 \times (n_g-1)} \\ \cdots & \cdots & \cdots \\ 0_{24 \times (n_g-1)} CON[,1] \cdot r_{n_g 1} & \cdots & 0_{24 \times (n_g-1)} CON[,n_c] \cdot r_{n_g n_c} \end{bmatrix}_{(24 \cdot n_g) \times (n_c \cdot n_g)};$$

$$A_2 = \begin{bmatrix} 11111111 & \cdots & 00000000 & \cdots & 00000000 \\ 00000000 & \cdots & 11111111 & \cdots & 00000000 \\ 00000000 & \cdots & 00000000 & \cdots & 11111111 \end{bmatrix}_{n_c \times (n_c \cdot n_g)};$$

and $$b = \begin{bmatrix} G_1 \cdot 1_{24 \times 1} & \cdots & G_{n_g} \cdot 1_{24 \times 1} N_1 & \cdots & N_{n_c} \end{bmatrix}^T_{1 \times (24 \cdot n_g + n_c)}.$$

In some embodiments, the COM 218 may design one or more LSE proposed coupons, which may be included in the coupon distribution expressions described above. The LSE proposed coupons make sure that the LSE has not missed any hours with beneficial coupons.

For example, the COM 218 may design 24 LSE proposed coupons, one for each hour of the day in which the DR event is scheduled. The LSE proposed coupon may be formatted according to LSE proposed coupon expressions:

ProposedCoupon[[h]]=c(M_id, Mj, U_id, Uj, h, h,1)

The LSE proposed coupon expressions has the same format as the coupon format expression. However in the LSE proposed coupon expression, h represents a counting variable that corresponds to an hour of the day. Accordingly, h is equal to [1, 2, . . . 24]. The coupon number is 1 and the DR start time and DR end time are equal to h. The number of available coupons selected is equal to 1, because the LSE proposed coupons are an evaluation tool to determine additional profits that a single coupon brings to the equation. If the COM 218 identifies one or more LSE proposed coupons that may be beneficial, the COM 218 may communicate a signal indicative of the LSE proposed coupons to the NMM 214. The NMM 214 may communicate the LSE proposed coupons to the merchant server 118. In response, the merchant server 118 may communicate new suggested coupons 212. The COM 218 may find a subsequent coupon distribution using the coupon distribution expressions and the new suggested coupons 212. The COM 218, the merchant server 118, and the NMM 214 may continue to iterate through the process of finding coupon distributions, LSE proposed coupons, new suggested coupons 212, etc. until negotiations are complete. For example, the iteration continues until there is no LSE proposed coupons or the merchants may be unable to accommodate new suggested coupons in the form of new suggested coupons 212.

Additionally or alternatively, a particular merchant contribution and/or an LSE contribution may be received for potential coupons. The particular merchant contribution and/or the LSE contribution may be received from an administrator, for instance. The COM 218 may identify LSE proposed coupons based on the particular merchant contribution and/or the LSE contribution. The LSE proposed coupons may be communicated to the merchant server 118 via the NMM 214. The merchant server 118 may generate and communicate new suggested coupons 212 to the NMM 214 based on the LSE proposed coupons. As described above, the COM 218 may find a subsequent coupon distribution using the coupon distribution expressions and the new suggested coupons 212. The COM 218, the merchant server 118, and the NMM 214 may continue to iterate through the process of finding coupon distributions, new suggested coupons 212, etc., until negotiations are complete. For example, the iteration continues until there are no LSE proposed coupons or the merchants may be unable to accommodate new suggested coupons 212.

After the negotiations are complete, the COM 218 may communicate the coupon distribution 206 or the subsequent coupon distribution (also represented by 206) to the CDM 222. The CDM 222 may distribute the coupons 232 to the customer devices 112 of the DR customers in the customer clusters according to the coupon distribution 206 (or the subsequent coupon distribution). One or more of the coupons 232 may be displayed on the customer device 112. For example, one or more of the coupons 232 may be displayed on a display or another user interface device of the customer device 112. At a given time interval or hour, a customer 120 may select one or more of the coupons 232. Selection of the one or more coupons 232 may manifest a commitment of the DR customer to participate in the DR event.

The CCM 220 may collect customer responses 208 (in FIG. 2, "responses 208"). The customer responses 208 may be responses to the distributed suggested coupons. The customer responses 208 may indicate participation of the DR customers in the DR event. The DBM 224 may estimate energy curtailment contributions of the DR customers and/or an actual energy price for at least a portion of the DR event based on the collected customer responses 208. The DBM 224 may then communicate an energy transaction bid 204 (in FIG. 2 "bid") to the ISO server 126. The energy transaction bid 204 may be based on the estimation of the energy curtailment and the actual energy price. The ISO server 126 may then communicate a market clearance result to the DBM 224. The LSE server 106 may then implement the DR event using the coupons distributed to the customer device 112 according to the coupon distribution.

Figure 4A:
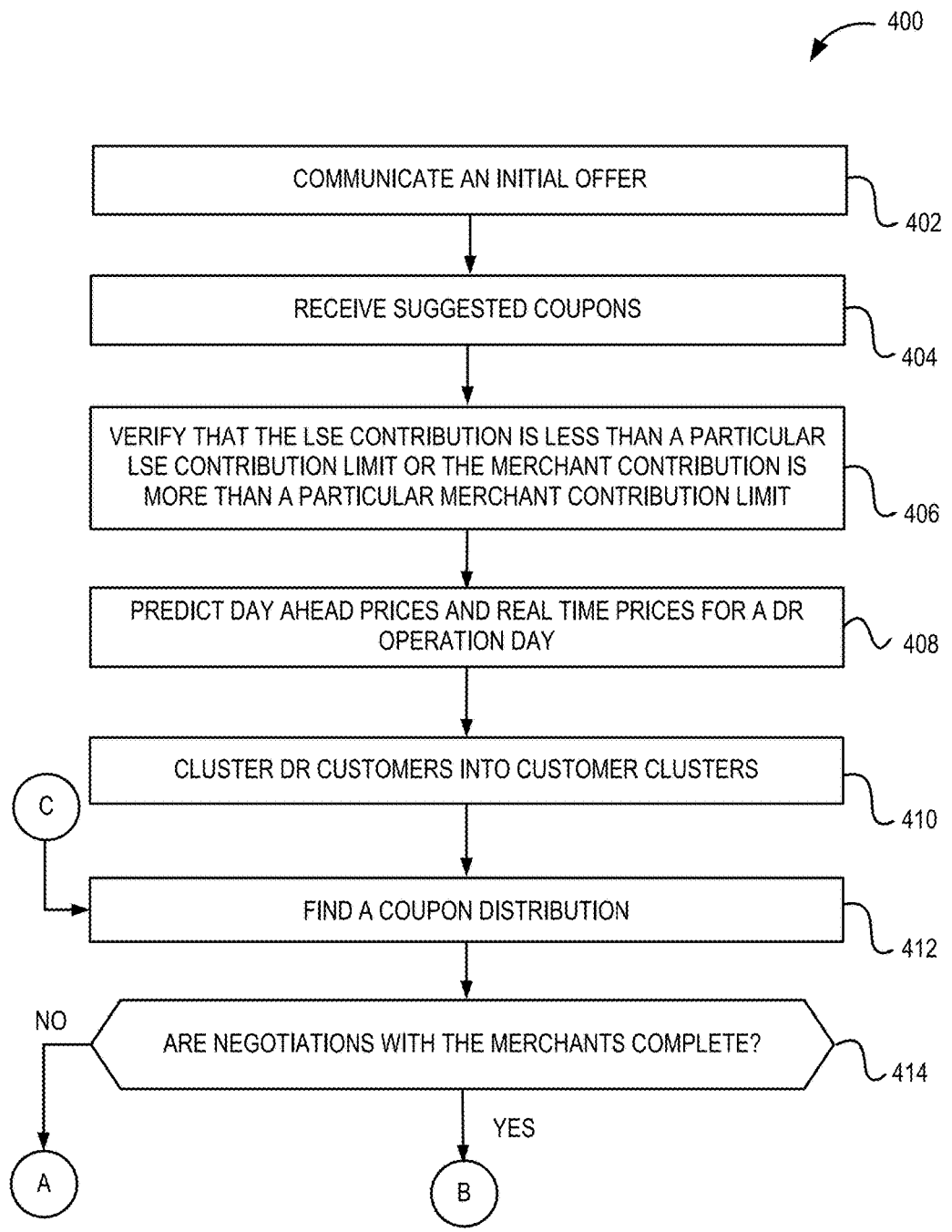
FIGS. 4A and 4B are a flow diagram of an example method of coupon distribution.
Figure 4B:
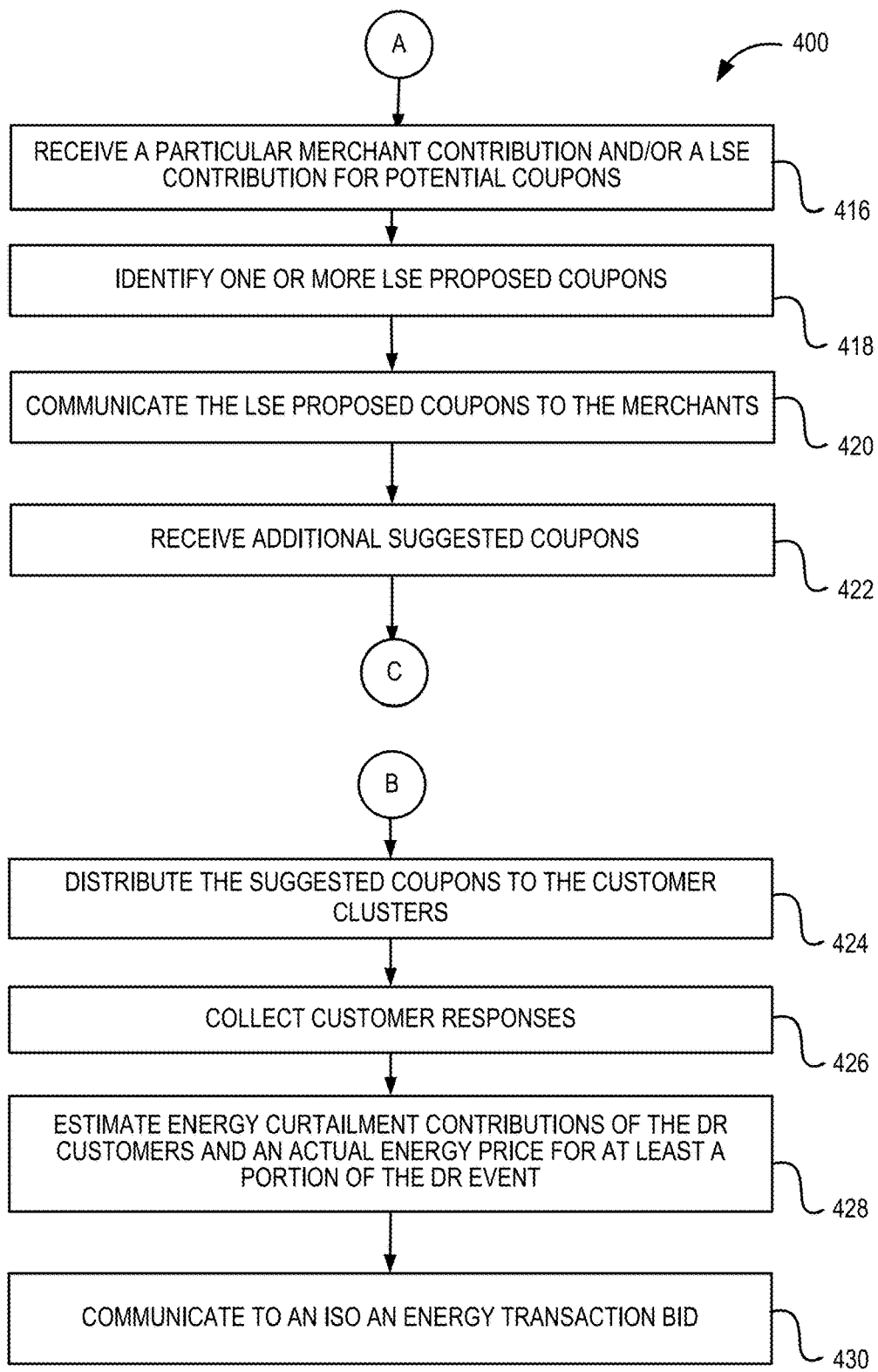

FIGS. 4A and 4B are a flow diagram of an example method 400 of coupon distribution, arranged in accordance with at least one embodiment described herein. The method 400 of FIGS. 4A and 4B are described with reference to FIG. 3. FIG. 3 illustrates an example sequence 300 in which the method 400 may be performed. In addition, FIG. 3 provides examples of modules, systems, or entities (e.g., 302, 118, 214, 218, 216, 220, 222, 120, 224, and 124) that may perform one or more portions of the method 400. FIG. 3 provides one example of the modules, systems, or entities that may perform the portions of method 400. In some embodiments, other modules, systems, or entities may perform the portions of the method 400.

In general, the method 400 may be programmably performed in some embodiments by the LSE server 106 described with reference to FIGS. 1 and 2. In some embodiments, the LSE server 106 or another computing device may include or may be communicatively coupled to a non-transitory computer-readable medium (e.g., the memory 508 of FIG. 5) having stored thereon programming code or instructions that are executable by a processor (such as the processor 504 of FIG. 5) to cause a computing device and/or the LSE server 106 to perform the method 400. Additionally or alternatively, the LSE server 106 may include the processor 504 described elsewhere in this disclosure that is configured to execute computer instructions to cause the LSE server 106 or another computing device to perform the method 400. Although illustrated as discrete blocks, various blocks may be divided into additional blocks, combined into fewer blocks, or eliminated, depending on the desired implementation.

With reference to FIGS. 3 and 4A, the method 400 may begin at block 402. At block 402, an initial offer may be communicated to one or more merchants. The initial offer may include initial coupon designs that have a merchant contribution, an LSE contribution, the related DR event, and a number of coupons. Referring to FIG. 3, the NMM 214 of the LSE server 106 may generate and/or communicate the initial offer to the merchant servers 118.

At block 404, suggested coupons may be received. For example, the suggested coupons may be received from two or more merchants. Each of the suggested coupons may include an LSE contribution and/or a merchant contribution for a DR event. Additionally, in some embodiments, each of the suggested coupons may include an acceptance of increased rates associated with a CPP program. In some embodiments, the suggested coupon may be formatted according to a coupon format expression. An example of the coupon format expression is provided elsewhere in this disclosure. Referring to FIG. 3, the merchant server(s) 118 may communicate suggested coupons to the NMM 214. The NMM 214 may receive the suggested coupons and then may communicate the suggested coupons or some portion thereof to the COM 218. The COM 218 of the LSE server 106 may receive the suggested coupons from the NMM 214.

At block 406, it may be verified that one or both of the LSE contribution is less than a particular LSE contribution limit or the merchant contribution is more than a particular merchant contribution limit. For example, LSE contribution and merchant contribution expressions may be verified. In response to the LSE contribution being greater than the particular LSE contribution limit or the merchant contribution being less than the particular merchant contribution limit, one or more of the suggested coupons may be filtered. Referring to FIG. 3, the NMM 214 may perform the verification. The NMM 214 may then filter or reject the suggested coupons that are not verified and communicate remaining suggested coupons to the COM 218.

At block 408, day ahead prices and real time prices (collectively, energy price forecast) may be predicted for a DR operation day. The energy price forecast may be based on historical price data and other historical data such as weather data or other ambient condition data that may affect energy usage. In some embodiments, the energy price forecast for the DR operation data may include a probabilistic distribution function. In some embodiments, the energy price forecast may include a particular value. Referring to FIG. 3, the energy price forecast may be predicted by one or more of the modules of the LSE server 106 such as the PPM 216. The PPM 216 may predict the energy price forecast. The PPM 216 may then communicate the price forecast to the COM 218.

At block 410, the DR customers may be clustered into customer clusters. The DR customers may be clustered based on energy use behaviors of the DR customers. The energy use behaviors may include curtailment behaviors or DR performance in previous DR events, for instance. Referring to FIG. 3, a module of the LSE server 106 may cluster the DR customers. For example, the CCM 220 may cluster the DR customers into customer clusters. Information regarding the customer clusters and other customer information may be communicated to the COM 218. For example, Gi, Ci, and Rij may be communicated to the COM 218.

At block 412 a coupon distribution may be found. The coupon distribution may be found based on the energy price forecast, the suggested coupons, customer information, or some combination thereof. The coupon distribution may be configured to generate a financial benefit to the LSE (e.g., LSE 104). The coupon distribution may be optimized to maximize the financial benefit to the LSE. The coupon distribution may include a specified number of the suggested coupons that are to be distributed to one or more of the customer clusters.

In some embodiments, the finding the coupon distribution is performed according to coupon distribution expressions. For example, the coupon distribution expressions may be similar to the coupon distribution expressions discussed elsewhere in this disclosure. In some embodiments, the finding the coupon distribution includes making the CON vector for each of the suggested coupons. The CON vector elements of the CON vector may be representative of the hours of the day of the DR event. The CON vector elements may be equal to zero unless the DR event is scheduled during a corresponding hour of the day and the CON vector elements may be equal to one if the DR event is scheduled during the corresponding hour of the day.

In some embodiments, the finding the coupon distribution includes making the UC vector for each of the suggested coupons. The UC vector elements of the UC vector may be representative of the hours of the day of the DR event. The UC vector elements may be equal to zero unless the DR event is scheduled during a corresponding hour of the day and the UC vector elements may be equal to an LSE contribution for the suggested coupon per hour if the DR event is scheduled during a corresponding hour of the day.

Referring to FIG. 3, the COM 218 may find the coupon distribution. For example, the energy price forecast communicated by the PPM 216, the suggested coupons communicated by the NMM 214, the information regarding the customer clusters, along with some other customer information may be used by the COM 218 to find the coupon distribution.

At block 414, it may be determined whether negotiations with merchants are complete. The determination of whether the negotiations with merchants are complete may be made by the NMM 214 or another module of the LSE server 106. In response to negotiations with the merchants being incomplete ("NO" at block 414), the method 400 may proceed to block 416. Referring to FIG. 4B, at block 416, a particular merchant contribution and/or a LSE contribution may be received for potential coupons. The particular merchant contribution and/or the LSE contribution may be received from an administrator, for instance. Referring to FIG. 3, an administrator 302 may communicate the particular merchant contribution and/or the LSE contribution to the COM 218.

At block 418, LSE proposed coupons may be identified. For example in some embodiments, the LSE proposed coupons may be based on the particular merchant contribution and/or the LSE contribution. Referring to FIG. 3, the COM 218 may identify LSE proposed coupons from the particular merchant contribution and/or the LSE contribution that are communicated from the administrator 302.

At block 420, the LSE proposed coupons may be communicated to the merchants. The LSE proposed coupons may be communicated prior to the distribution of the suggested coupons to the DR customers. Referring to FIG. 3, the COM 218 may communicate the LSE proposed coupons to the NMM 214. The NMM 214 may then communicate the LSE proposed coupons to the merchant servers 118.

At block 422, new suggested coupons may be received. The new suggested coupons may be received from the merchants. In some circumstances, the new suggested coupons may be based on the new suggested coupons, for example. In some embodiments, the new suggested coupons may be received prior to distribution of suggested coupons to the DR customers. Referring to FIG. 3, the merchant servers 118 may communicate the new suggested coupons to the NMM 214, which may filter the new suggested coupons. The NMM 214 may then communicate the new suggested coupons or some portion thereof to the COM 218.

From block 422, the method 400 may proceed to block 412 of FIG. 4A. At block 412, a subsequent coupon distribution may be found. The subsequent coupon distribution may be found based on the energy price forecast, the new suggested coupons (or some portion thereof), the customer information, or some combination thereof. The method 400 may proceed through one or more of blocks 414, 416, 418, 420, and 422 until the negotiations with the merchants are complete ("YES" at block 414). For example, with reference to FIG. 3, a loop 310 is included in the sequence 300. The loop 310 may continue until negotiations with the merchants are complete.

In response to the negotiations being complete ("YES" at block 414), the method 400 may proceed to block 424 of FIG. 4B. At block 424, the suggested coupons may be distributed to the customer clusters. For example, the suggested coupons may be distributed according to the coupon distribution or the subsequent coupon distribution. Referring to FIG. 3, the COM 218 may communicate the suggested coupons to the CDM 222. The CDM 222 may communicate the suggested coupons to the DR customers 120 according to the coupon distribution or the subsequent coupon distribution.

At block 426, customer responses may be collected. The customer responses may be responses to the distributed suggested coupons. The customer responses may indicate participation of the DR customers 120 in the DR event and more particularly may indicate which or how many DR customers 120 have committed to participate in the DR event. At a given time interval or hour, a DR customer may respond to one or more of the suggested coupons in a DR event. The availability of a coupon may depend on the responses from the DR customers of the same customer cluster. Referring to FIG. 3, the customer responses may be communicated from the DR customers 120 to the CDM 222, which may be used in later coupon distributions. In addition, the DR customers 120 may communicate customer responses to the DBM 224.

At block 428, energy curtailment contributions of the DR customers and/or an actual energy price for at least a portion of the DR event may be estimated based on the collected customer responses. Referring to FIG. 3, the DBM 224 may estimate the energy curtailment contributions of the DR customers and/or an actual energy price.

At block 430, an energy transaction bid may be communicated to an ISO. The energy transaction bid may be based on the estimation of the energy curtailment and the actual energy price. Referring to FIG. 3, the DBM 224 may communicate and/or generate the energy transaction bid to the ISO server 124. The ISO may then communicate a market clearance result to the DBM 224, which is represented by 308 in FIG. 3.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For example, the method 400 may include determining a number of the suggested coupons to address a need of the LSE. In response to a determination that there is an insufficient number, the method 400 may include suggesting one or more new coupons to the merchants.

Figure 5:
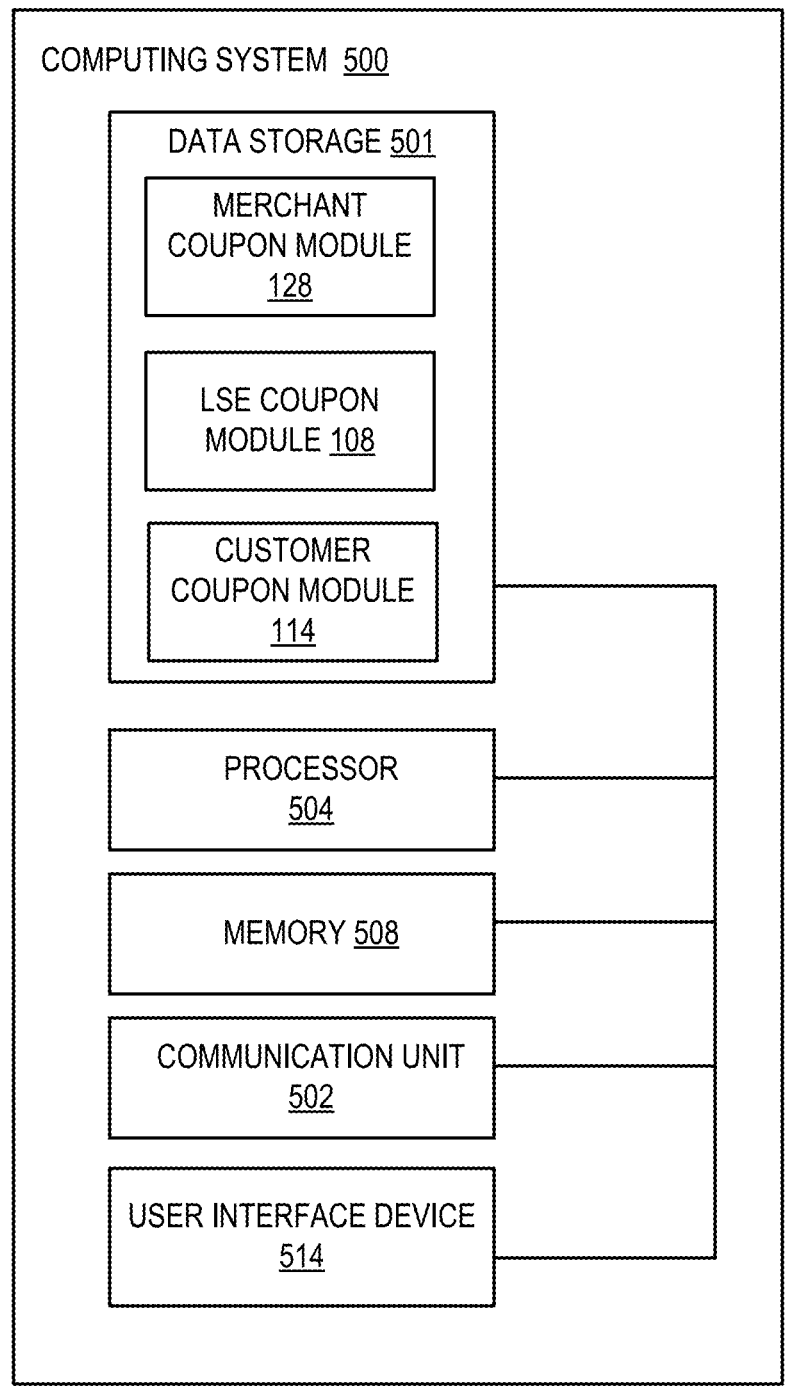
FIG. 5 illustrates an example computing system configured for one or more coupon distribution processes.

FIG. 5 illustrates an example computing system 500 configured for one or more coupon distribution processes. The computing system 500 may be implemented in the operating environment 100 of FIG. 1 and/or the operating environment 250 of FIG. 2. Examples of the computing system 500 may include one or more of the LSE server 106, the merchant server 118, the ISO server 126, and the customer device 112. The computing system 500 may include one or more processors 504, a memory 508, a communication unit 502, a user interface device 514, and a data storage 501 that includes one or more of the customer coupon module 114, the merchant coupon module 128, and the LSE coupon module 108 (collectively, modules 110/128/108).

The processor 504 may include any suitable special-purpose or general-purpose computer, computing entity, or processing device including various computer hardware or software modules and may be configured to execute instructions stored on any applicable computer-readable storage media. For example, the processor 504 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, the processor 504 may more generally include any number of processors configured to perform individually or collectively any number of operations described in the present disclosure. Additionally, one or more of the processors 504 may be present on one or more different electronic devices or computing systems. In some embodiments, the processor 504 may interpret and/or execute program instructions and/or process data stored in the memory 508, the data storage 501, or the memory 508 and the data storage 501. In some embodiments, the processor 504 may fetch program instructions from the data storage 501 and load the program instructions in the memory 508. After the program instructions are loaded into the memory 508, the processor 504 may execute the program instructions.

The memory 508 and the data storage 501 may include computer-readable storage media for carrying or having computer-executable instructions or data structures stored thereon. Such computer-readable storage media may include any available media that may be accessed by a general-purpose or special-purpose computer, such as the processor 504. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 504 to perform a certain operation or group of operations.

The communication unit 502 may include one or more pieces of hardware configured to receive and send communications. In some embodiments, the communication unit 502 may include one or more of an antenna, a wired port, and modulation/demodulation hardware, among other communication hardware devices. In particular, the communication unit 502 may be configured to receive a communication from outside the computing system 500 and to present the communication to the processor 504 or to send a communication from the processor 504 to another device or network.

The user interface device 514 may include one or more pieces of hardware configured to receive input from and/or provide output to a user. In some embodiments, the user interface device 514 may include one or more of a speaker, a microphone, a display, a keyboard, a touch screen, or a holographic projection, among other hardware devices. In these and other embodiments, the user interface device 514 may be configured to receive input from a DR customer or administrator.

The modules 110/128/108 may include program instructions stored in the data storage 501. The processor 504 may be configured to load the modules 110/128/108 into the memory 508 and execute the modules 110/128/108. Alternatively, the processor 504 may execute the modules 110/128/108 line-by-line from the data storage 501 without loading them into the memory 508. When executing the modules 110/128/108, the processor 504 may be configured for performance of a coupon distribution process as described elsewhere in this disclosure.

Modifications, additions, or omissions may be made to the computing system 500 without departing from the scope of the present disclosure. For example, in some embodiments, the computing system 500 may not include the user interface device 514. In some embodiments, the different components of the computing system 500 may be physically separate and may be communicatively coupled via any suitable mechanism. For example, the data storage 501 may be part of a storage device that is separate from a server, which includes the processor 504, the memory 508, and the communication unit 502, that is communicatively coupled to the storage device.

FIGS. 6A-6K illustrate a simulated example of coupon distributions according to one or more processes described in this disclosure. The simulated example receives as inputs an energy price forecast for operation day (OD), an initial coupon design, and customer information. The energy price forecast may be represented by the price forecast expressions:

PPh;

$h=\{1 \ldots 24\}$

In the price forecast expression, PP represents a price prediction. The parameter h represents an hour. Accordingly, PP1 represents the price prediction for 12:00 AM until 12:59 AM.

The initial coupon design may include a merchant contribution, an LSE contribution, scheduled times related to a DR event, and number of coupons as described elsewhere in this disclosure. For instance the initial coupon may be represented by the coupon j expression:

Coupon[[j]]=c('M',1,'U',0.5,'2 pm','4 pm',100000);

In the coupon j expression, coupon j is for the DR event from 2:00 PM until 4:00 PM. The LSE contribution is $0.5 and the merchant contribution is $1. In addition, there are 100,000 of coupon j available.

The customer information for the simulation includes a number of DR customers in each customer cluster (e.g., Gi), a vector of expected curtailment per DR customer in each customer cluster in the next 24 hours conditioned on their response (e.g., Ci), and a matrix of acceptance rate of coupon j in each of the customer clusters indexed by i (e.g., Rij). In this simulation scenario, there are 100 suggested coupons and 50 customer clusters with the corresponding Gi, Ci, and Rij. The total number of customers in these 50 customer clusters is 2,865,900.

Figure 6A:
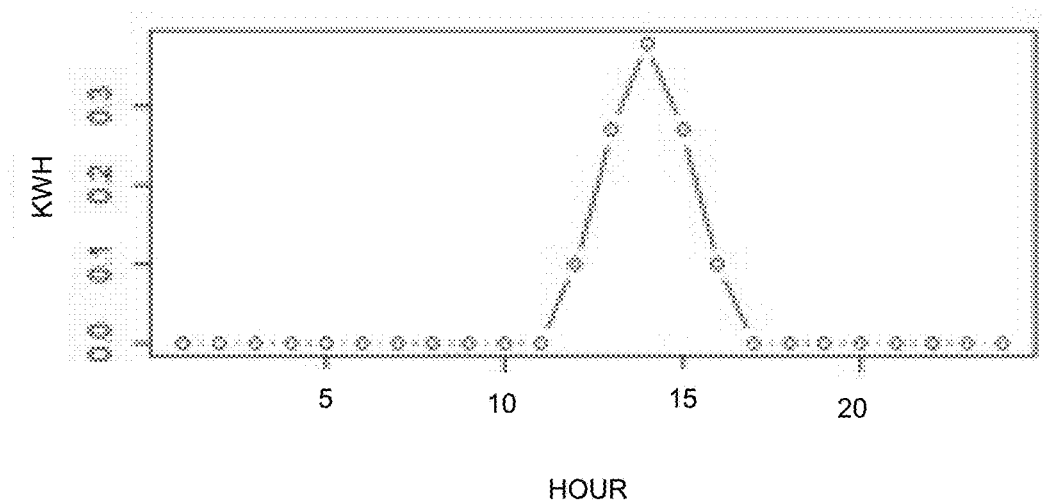
Figure 6B:
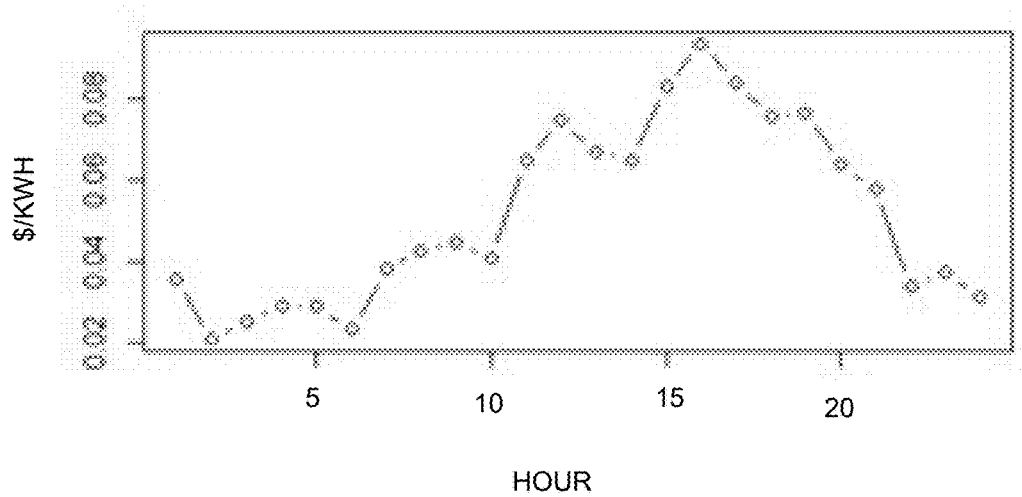
Figure 6C:
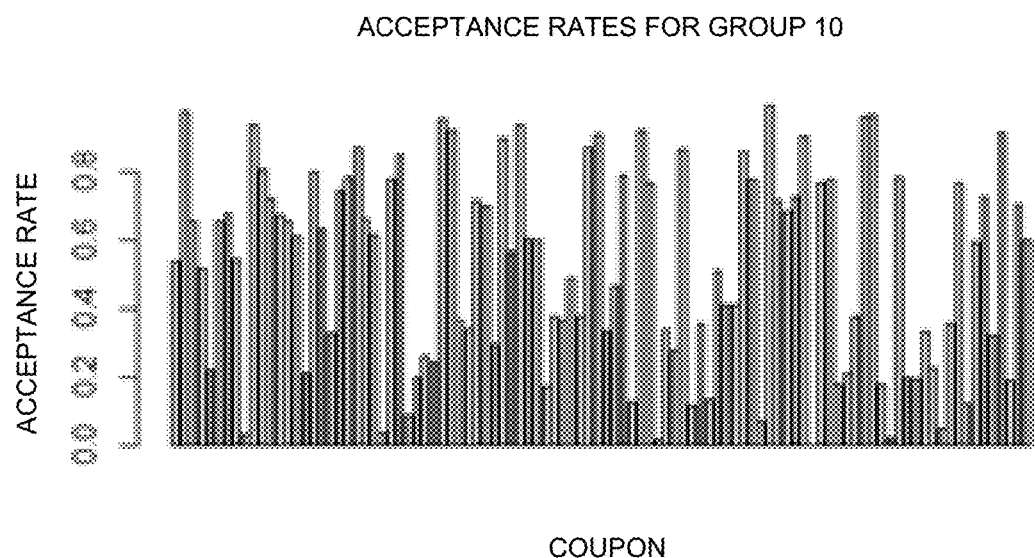

FIGS. 6A and 6B depict an example curtailment curve for one of the curtailment clusters referred to as "group 10" and an example predicted price curve. In the simulation, Group 10 has 26600 customers and the acceptance rate of this customer cluster to the 100 suggested coupons is depicted in FIG. 6C. In the simulation, the values in FIGS. 6A-6C are randomly generated.

Figure 6D:
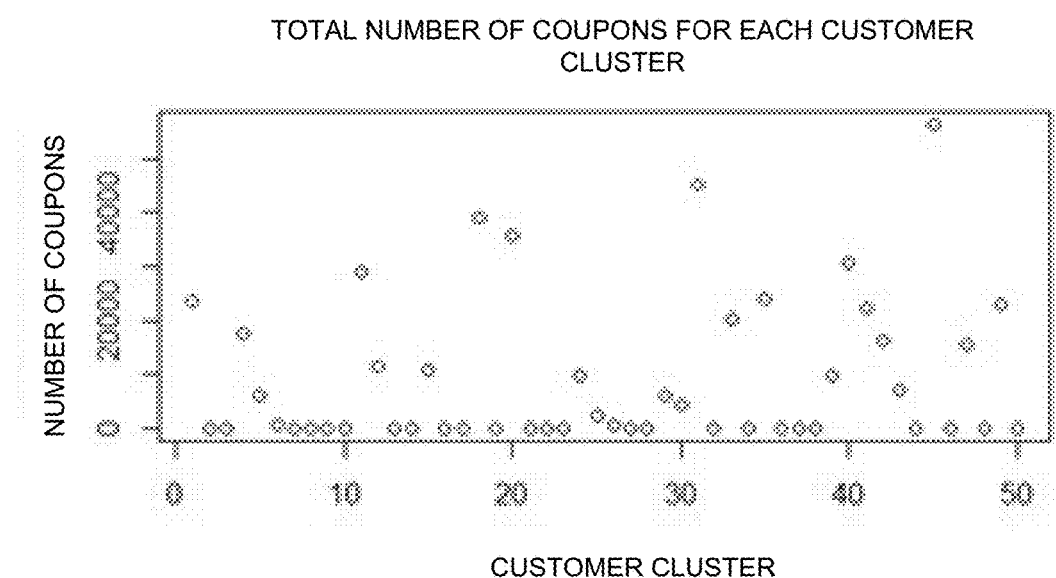
Figure 6E:
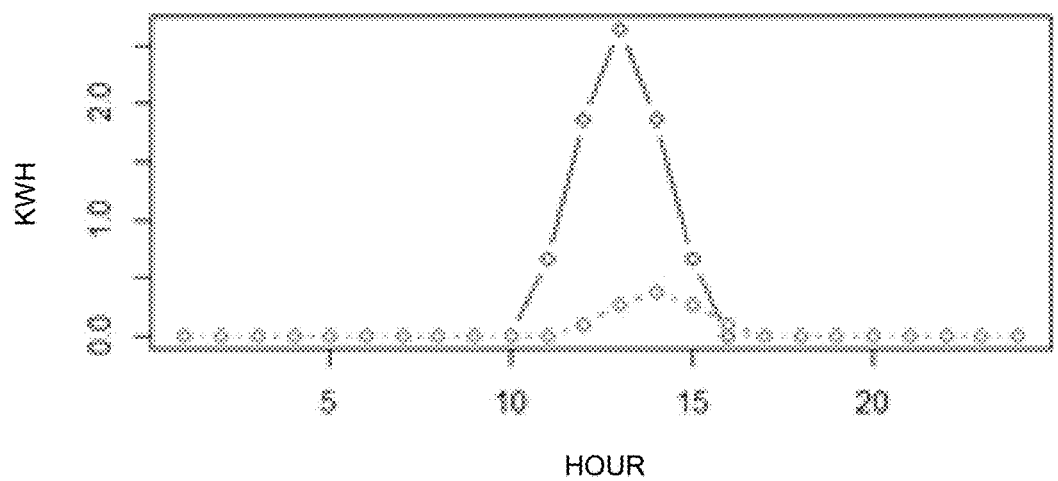
Figure 6F:
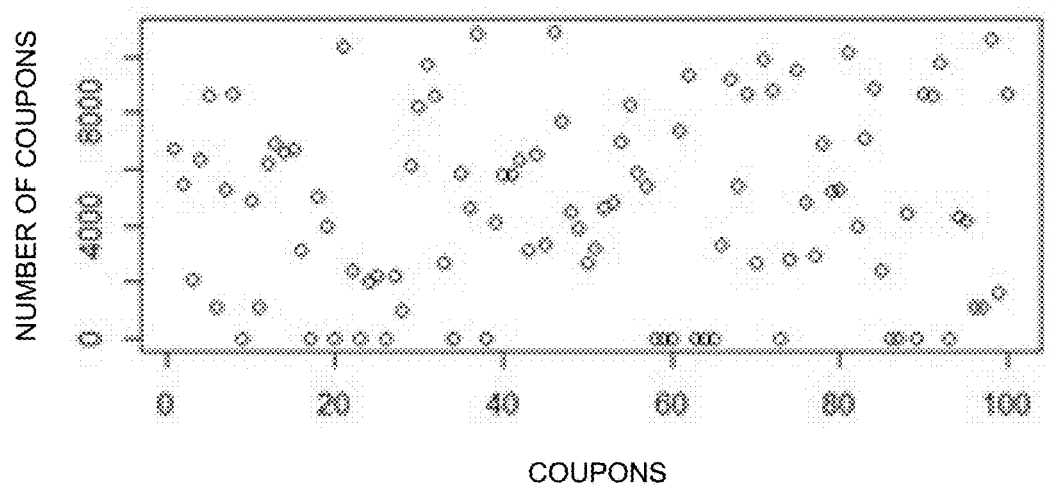

In the simulation, after the inputs are prepared, analysis of current coupons occurs. Analysis of the current coupons may occur when coupons have not finalized yet and the LSE is in the state of negotiation with merchants to design coupons. In this mode, the optimum number of each of the suggested coupons for each customer cluster may be found. In addition, the coupons may be ranked in the order of their value for the LSE (per accepted coupon). Moreover, new designs for coupons may be proposed. The optimization is from the LSE's perspective. In the simulation, a DC is output. The DC is in the form of a 50×100 matrix where $DC_{ij}$ is the number of coupons j that are to be distributed in customer cluster identified by the customer cluster index parameter i. FIG. 6D shows the total number of different coupons assigned to each of the customer clusters According to FIG. 6D, Group 10 does not qualify to distribute any coupons, while another customer cluster "Group 45" receives 56,400 coupons. The curtailment pattern of both group 10 and group 45 are depicted in FIG. 6E. The reason for receiving no coupons by Group 10, is their less promising demand response contribution compared with Group 45 although both groups curtail the load in almost the same hours.

In addition to FIG. 6E, the optimal coupon distribution may be viewed by a number of distributed coupons from each coupon type. The optimal coupon distribution is depicted viewed by the number of distributed coupons in FIG. 6F. According to the FIGS. 6A-6F, one of the coupon types that was not distributed at all is coupon 17 while coupon 46 is suggested to be distributed completely, i.e., 10,900 coupons.

For example, these are the design parameters of coupon 17:

Coupon[[17]]

[1] "M" "0.05" "U" "0.1" "1" "2" "5300"

Coupon 17 wants the LSE to contribute $0.1/kWh for two hours from 1:00 AM to 2:00 AM (average of 5 cents/kWh per hour for the LSE contribution for this coupon). However, the predicted price is 3 and 2 cents/kWh for 1:00 AM and 2:00 AM, respectively. Thus, there is no economic motivation for the LSE to contribute 10 cents/kWh for this coupon. On the other hand, coupon 46 demands 3 cents/kWh from LSE at 12:00 PM and the predicted price is 6 cents/kWh. This demand and predicted price may indicate that the LSE may sell each kWh of power for 6 cents while paying 3 cents to the customer in the form of a coupon for the same amount of energy. These are design parameters of coupon 46:

Coupon[[46]]

[1] "M" "0.05" " U" "0.03" "12" "12" "10900"

Figure 6G:
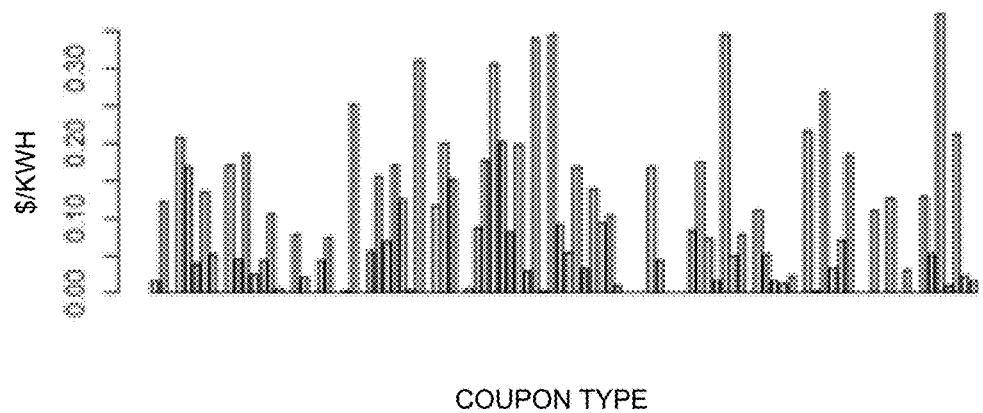

The simulation may also output information regarding which of the coupons it is better to have more of FIG. 6I represents output information regarding which of the coupons (e.g., the 100 coupons of FIG. 6F) it is better to have more of. In FIG. 6I, there are 81 coupons referred to by a coupon identifier. The 81 coupons identified in the output information of FIG. 6I indicates that more coupons are beneficial for the LSE from 81 coupon types. For the other 19 coupons, which are not listed in FIG. 6I, there is no benefit for the LSE to solicit more. The same information has been depicted in FIG. 6G. FIG. 6G depicts an increase in the revenue per extra coupon from each coupon type.

Figure 6H:
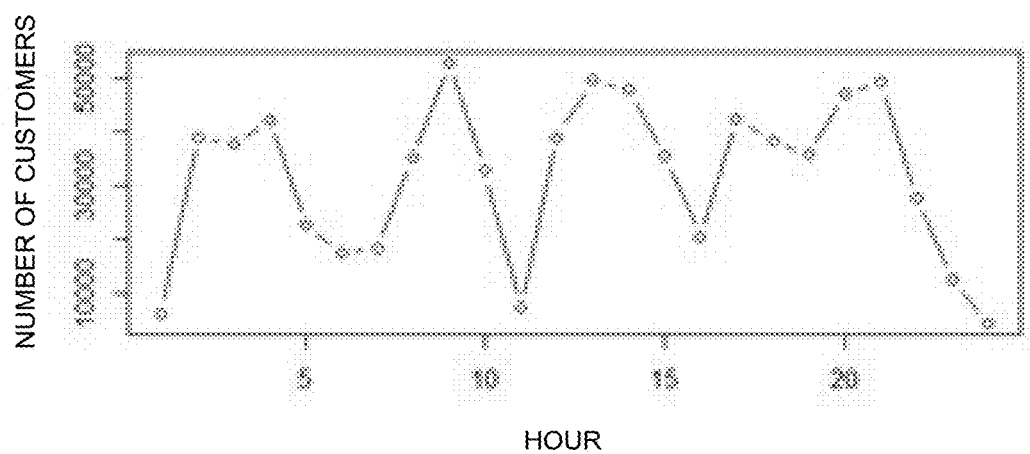
Figures 6I, 6J:
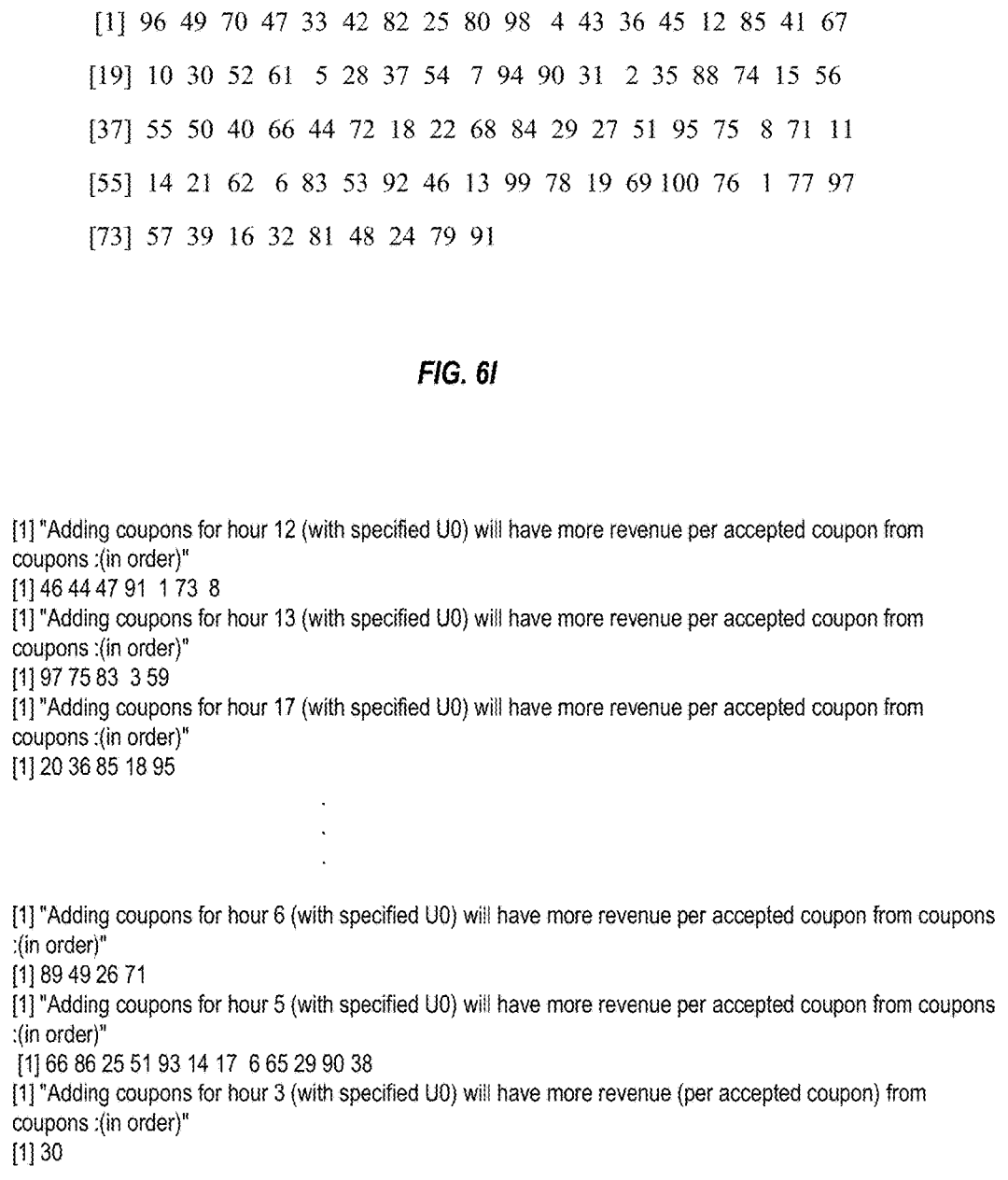

FIG. 6H illustrates an expected number of DR customers to respond for all the coupons. The expected number of DR customers to respond for all the coupons each hour shows that depending on the acceptance ratio, the maximum number of participating customers from all customer clusters (52,867) might be a lot less than total number of DR customers (2,865,900). In addition, the expected revenue with this specific distribution of coupons is:

[1] "Expected Revenue 51396.206243793 $

For example, using the coupon distribution expression (discussed above), the expected revenue for the specific distribution of coupons may be calculated.

After analysis of the current suggested coupons, new coupons may be designed. The new coupons may be configured to increase the revenue of the LSE. Design of the new coupons may involve the administrator specifying merchant and LSE contribution (per hour) for the potential coupons. If an LSE contribution is selected in each coupon as $0.04/hour, new coupons may be suggested. For example, FIG. 6J represents suggestions of new coupons.

In addition, in the simulation an output may include a report that ranks all the suggested coupons and the hours together. FIG. 6K represents an example of the report. From FIG. 6K, it may be determined that if we have a coupon for a DR event at 12:00 PM, the coupon may be beneficial to the LSE. In FIG. 6K, the rank 19 shows that introducing a coupon for 12:00 PM with the LSE contribution of less than or equal to $0.04 per kilowatt-hour (kWh) will be more beneficial to the LSE than all other coupons below it. It indicates that an opportunity of designing a coupon for 12:00 PM was overlooked and may be reconsidered. This is also reflected in the first line of FIG. 6J. Specifically:

[1] "Adding coupons for hour 12 (with specified Uo) will have more revenue per accepted coupon from coupons: (in order)"

[1] 46 44 47 91 1 73 8

In FIG. 6K, this is also the case for 1:00 PM (rank 27), 5:00 PM (rank 33), etc. A coupon may be designed to cover these valuable hours. Based on the information of FIGS. 6J and 6K, the LSE may negotiate with merchants to design new suggested coupons. This process will iterate until there is no new suggestions or merchants may be unable to accommodate new suggestions.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may include any available media that may be accessed by a general-purpose or special-purpose computer. By way of example, and not limitation, such computer-readable media may include non-transitory computer-readable storage media including random access memory (RAM), read-only memory (ROM), electrically erasable programmable read-only memory (EEPROM), compact disc read-only memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processor device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general-purpose hardware (e.g., computer-readable media, processor devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and constraints. Although embodiments of the present inventions have been described in detail, it should be understood that the various changes, substitutions, and alterations could be made hereto without departing from the spirit and scope of the invention.

What is claimed is:

1. A method of coupon distribution for a demand response (DR) event, the method comprising:

clustering one or more DR customers into two or more customer clusters based on energy use behaviors of the one or more DR customers;

receiving suggested coupons from two or more merchants, the suggested coupons each including both a load serving entity (LSE) contribution and a merchant contribution for a DR event, wherein the LSE contribution includes a monetary amount credited to a utility bill of a DR customer of an LSE that participates in the DR event and wherein the merchant contribution includes a financial incentive from the merchant to the DR customer;

verifying that the monetary amount is less than a particular LSE contribution limit or the financial incentive is more than a particular merchant contribution limit;

based on an energy price forecast, the suggested coupons, and customer information, finding a coupon distribution that generates a financial benefit to the LSE, the coupon distribution including a specified number of the suggested coupons to be distributed to one or more of the customer clusters;

distributing one or more of the suggested coupons to one or more of the customer clusters according to the coupon distribution;

collecting customer responses to the distributed suggested coupons that indicate participation of the DR customers;

based on the collected customer responses, estimating energy curtailment contributions of the DR customers and an actual energy price for at least a portion of the DR event;

communicating to an independent system operator (ISO) an energy transaction bid based on the estimation of the energy curtailment and the actual energy price;

receiving a market clearance result that accepts the energy transaction bid; and responsive to the market clearance result, implementing a DR event at one or more sites using the coupons distributed to the customer clusters according to the coupon distribution, the implementing the DR event including communication of commands to equipment of the DR customers from which the customer responses were collected that indicate participation, the commands being configured to reduce an operating condition or cease operation of the equipment at the sites during the DR event.

2. The method of claim 1, further comprising:
receiving a particular merchant contribution and/or an LSE contribution for potential coupons;
identifying one or more LSE proposed coupons based on the particular merchant contribution and/or the LSE contribution; and
prior to the distributing the suggested coupons:
  communicating the LSE proposed coupons to the merchants;
  receiving new suggested coupons; and
  finding a subsequent coupon distribution based on the energy price forecast, the new suggested coupons, and the customer information.

3. The method of claim 1, wherein the energy use behaviors includes curtailment behaviors or DR performance in previous DR events.

4. The method of claim 1, wherein the suggested coupons are formatted according to an expression:

Coupon=$c(M\_id, Mj, U\_id, Uj,$ DR start time, DR end time, coupon#), in which:

j represents a coupon index parameter;
Coupon represents one of the suggested coupons identified by the coupon index parameter j;
M_id represents an identifier of one of the merchants;
Mj represents a merchant contribution of the coupon identified by the coupon index parameter j of the merchant;
U_id represents an identifier of an LSE;
Uj represents an LSE contribution of the coupon identified by the coupon index parameter j of the LSE;
DR start time represents a start time of a DR event for which the coupon identified by the coupon index parameter j is suggested;
DR end time represents an end time of the DR event; and
coupon# represents a number of coupons offered.

5. The method of claim 1, wherein the verifying is performed according to expressions:

$$U\_j < U\_o;$$

and $$M\_j > M\_o;$$

in which;
j represents a coupon index parameter;
U_j represents the LSE contribution for one of the suggested coupons identified by the coupon index parameter j;
M_j represents the merchant contribution for the suggested coupons identified by the coupon index parameter j;
U_o represents a maximum LSE contribution; and
M_o represents a minimum contribution for a specific merchant.

6. The method of claim 1, further comprising:
determining a number of the suggested coupons to address a need of the LSE; and
in response to a determination that there is an insufficient number, suggesting one or more new coupons.

7. The method of claim 1, further comprising predicting day ahead prices and real time prices for a DR operation day based on historical price data and other historical data, wherein the day ahead prices and the real time prices for the DR operation day are included in the energy price forecast.

8. The method of claim 1, wherein the finding the coupon distribution is performed according to expressions:

$$\max_{DC_{ij}} \sum_i \sum_j [(PP.*C[,i] - UC[,j])^T * CON[,j] \cdot DC_{ij} \cdot r_{ij}];$$

which is subject to:

$$\sum_i DC_{ij} \le N_j \; \forall \; j; \text{ and}$$

$$\sum_j CON[,j]^T_{24\times 1} \cdot DC_{ij} \cdot r_{ij} \le [G_i \; G_i \; \ldots \; G_i]^T_{24\times 1} \; \forall \; i,$$

in which:

max represents a maximization function;
i represents a customer cluster index parameter;
j represents a coupon index parameter;
DC represents the coupon distribution;
PP. represents an energy price forecast for an hour of a day;
C represents a vector of expected curtailment per customer in a customer cluster in the next 24 hours;
UC represents a UC vector of LSE contribution at each hour for one of the suggested coupons identified by the coupon index parameter j;
CON represents a coupon on (CON) vector of binary {0, 1} showing a time of a day of the DR event associated with the suggested coupons identified by the coupon index parameter j;

$r_{ij}$ represents an acceptance rate of the suggested coupons identified by the coupon index parameter j in one of the customer clusters identified by the customer cluster index parameter i;

Nj represents a number of available coupons of the suggested coupons identified by the coupon index parameter j;

GI represents a number of customers in the customer cluster identified by the customer cluster index parameter i; and ∀ represents a "for any" operator.

9. The method of claim 8, wherein:
the finding the coupon distribution includes making the CON vector for each of the suggested coupons;
each CON vector element of the CON vector is representative of an hour of the day of the DR event;
the CON vector element is equal to zero unless the DR event is scheduled during a corresponding hour of the day;
the CON vector element is equal to one if the DR event is scheduled during the corresponding hour of the day;
the finding the coupon distribution includes making the UC vector for each of the suggested coupons;
each UC vector element of the UC vector is representative of an hour of the day of the DR event;
the UC vector element is equal to zero unless the DR event is scheduled during a corresponding hour of the day; and
the UC vector element is equal to an LSE contribution for the suggested coupon per hour if the DR event is scheduled during a corresponding hour of the day.

10. The method of claim 1, wherein the suggested coupons each include an acceptance of increased rates associated with a critical peak pricing (CPP) program.

11. A non-transitory computer-readable medium having encoded therein programming code executable by a processor to perform or control performance of operations comprising:
clustering one or more DR customers into two or more customer clusters based on energy use behaviors of the one or more DR customers;
receiving suggested coupons from two or more merchants, the suggested coupons each including both a load serving entity (LSE) contribution and a merchant contribution for a DR event, wherein the LSE contribution includes a monetary amount credited to a utility bill of a DR customer of an LSE that participates in the DR event and wherein the merchant contribution includes a financial incentive from the merchant to the DR customer;
verifying that the monetary amount is less than a particular LSE contribution limit or the financial incentive is more than a particular merchant contribution limit;
based on an energy price forecast, the suggested coupons, and customer information, finding a coupon distribution that generates a financial benefit to the LSE, the coupon distribution including a specified number of the suggested coupons to be distributed to one or more of the customer clusters;
distributing one or more of the suggested coupons to one or more of the customer clusters according to the coupon distribution;
collecting customer responses to the distributed suggested coupons that indicate participation of the DR customers;
based on the collected customer responses, estimating energy curtailment contributions of the DR customers and an actual energy price for at least a portion of the DR event; and
communicating to an independent system operator (ISO) an energy transaction bid based on the estimation of the energy curtailment and the actual energy price.

12. The non-transitory computer-readable medium of claim 11, wherein the operations further comprise:
receiving a particular merchant contribution and/or an LSE contribution for potential coupons;
identifying one or more LSE proposed coupons based on the particular merchant contribution and/or the LSE contribution; and
prior to the distributing the suggested coupons:
communicating the LSE proposed coupons to the merchants;
receiving new suggested coupons; and
finding a subsequent coupon distribution based on the energy price forecast, the new suggested coupons, and the customer information.

13. The non-transitory computer-readable medium of claim 11, wherein the energy use behaviors includes curtailment behaviors or DR performance in previous DR events.

14. The non-transitory computer-readable medium of claim 11, wherein the suggested coupons are formatted according to an expression:

Coupon=c(M_id, Mj, U_id, Uj, DR start time, DR end time, coupon#), in which:

j represents a coupon index parameter;
Coupon represents one of the suggested coupons identified by the coupon index parameter j;
M_id represents an identifier of one of the merchants;
Mj represents a merchant contribution of the coupon identified by the coupon index parameter j of the merchant;
U_id represents an identifier of an LSE;
Uj represents an LSE contribution of the coupon identified by the coupon index parameter j of the LSE;
DR start time represents a start time of a DR event for which the coupon identified by the coupon index parameter j is suggested;
DR end time represents an end time of the DR event; and
coupon# represents a number of coupons offered.

15. The non-transitory computer-readable medium of claim 11, wherein verifying is performed according to expressions:

U_j<U_o;

and

M_j>M_o;

in which;
j represents a coupon index parameter;
U_j represents the LSE contribution for one of the suggested coupons identified by the coupon index parameter j;
M_j represents the merchant contribution for the suggested coupons identified by the coupon index parameter j;
U_o represents a maximum LSE contribution; and
M_o represents a minimum contribution for a specific merchant.

16. The non-transitory computer-readable medium of claim 11, wherein the operations further comprise:

determining a number of suggested coupons to address a need of the LSE; and in response to a determination that there is an insufficient number, suggesting one or more new coupons.

17. The non-transitory computer-readable medium of claim 11, wherein the operations further comprise predicting day ahead prices and real time prices for a DR operation day based on historical price data and other historical data, wherein the day ahead prices and the real time prices for the DR operation day are included in the energy price forecast.

18. The non-transitory computer-readable medium of claim 11, wherein the finding the coupon distribution is performed according to expressions:

$$\max_{DC_{ij}} \sum_i \sum_j [(PP. * C[,i] - UC[,j])^T * CON[,j] \cdot DC_{ij} \cdot r_{ij}];$$

which is subject to:

$$\sum_i DC_{ij} \leq N_j \; \forall \; j; \text{ and}$$

max represents a maximization function;
i represents a customer cluster index parameter;
j represents a coupon index parameter;
DC represents the coupon distribution;
PP. represents an energy price forecast for an hour of a day;
C represents a vector of expected curtailment per customer in a customer cluster in the next 24 hours;
UC represents a UC vector of LSE contribution at each hour for one of the suggested coupons identified by the coupon index parameter j;
CON represents a coupon on (CON) vector of binary {0, 1} showing a time of a day of the DR event associated with the suggested coupons identified by the coupon index parameter j;

$r_{ij}$ represents an acceptance rate of the suggested coupons identified by the coupon index parameter j in one of the customer clusters identified by the customer cluster index parameter i;
Nj represents a number of available coupons of the suggested coupons identified by the coupon index parameter j;
GI represents a number of customers in the customer cluster identified by the customer cluster index parameter i; and
$\forall$ represents a "for any" operator.

19. The non-transitory computer-readable medium of claim 18, wherein:

the finding the coupon distribution includes making the CON vector for each of the suggested coupons;

each CON vector element of the CON vector is representative of an hour of the day of the DR event;

the CON vector element is equal to zero unless the DR event is scheduled during a corresponding hour of the day;

the CON vector element is equal to one if the DR event is scheduled during the corresponding hour of the day;

the finding the coupon distribution includes making the UC vector for each of the suggested coupons;

each UC vector element of the UC vector is representative of an hour of the day of the DR event;

the UC vector element is equal to zero unless the DR event is scheduled during a corresponding hour of the day; and the UC vector element is equal to an LSE contribution for the suggested coupon per hour if the DR event is scheduled during a corresponding hour of the day.

20. The non-transitory computer-readable medium of claim 18, wherein the suggested coupons each include an acceptance of increased rates associated with a critical peak pricing (CPP) program.

* * * * *